(12) United States Patent
Fontecilla

(10) Patent No.: US 11,321,538 B1
(45) Date of Patent: May 3, 2022

(54) ENSEMBLE NATURAL LANGUAGE PROCESSING MODEL WITH COMPLIANCE VERIFICATION

(71) Applicant: DOVEL TECHNOLOGIES, LLC, McLean, VA (US)

(72) Inventor: Rod Fontecilla, McLean, VA (US)

(73) Assignee: DOVEL TECHNOLOGIES, LLC, McLean, VA (US)

( * ) Notice: Subject to any disclaimer, the term of this patent is extended or adjusted under 35 U.S.C. 154(b) by 0 days.

(21) Appl. No.: 17/502,184

(22) Filed: Oct. 15, 2021

(51) Int. Cl.
| | | |
|---|---|---|
| *G06F 40/40* | (2020.01) | |
| *G06N 3/04* | (2006.01) | |
| *G06K 9/62* | (2022.01) | |
| *G06F 40/284* | (2020.01) | |

(52) U.S. Cl.
CPC ............ *G06F 40/40* (2020.01); *G06F 40/284* (2020.01); *G06K 9/6232* (2013.01); *G06N 3/0454* (2013.01)

(58) Field of Classification Search
CPC ..... G06F 40/30; G06F 40/284; G06K 9/6932; G06N 3/0454
See application file for complete search history.

(56) References Cited

U.S. PATENT DOCUMENTS

| 10,048,945 | B1 * | 8/2018 | Makkar | G06F 8/36 |
|---|---|---|---|---|
| 10,845,885 | B2 * | 11/2020 | Bostick | G06F 3/0482 |
| 10,896,222 | B1 * | 1/2021 | Christodoulopoulos | |
| | | | | G06F 40/295 |
| 2005/0143971 | A1 * | 6/2005 | Burstein | G06F 40/253 |
| | | | | 704/4 |
| 2017/0132498 | A1 * | 5/2017 | Cohen | G06N 3/08 |
| 2017/0132526 | A1 * | 5/2017 | Cohen | G06N 5/022 |
| 2017/0374093 | A1 * | 12/2017 | Dhar | H04L 63/1433 |
| 2018/0232358 | A1 * | 8/2018 | Badenes | G06F 40/30 |
| 2019/0179895 | A1 * | 6/2019 | Bhatt | G06F 16/3334 |
| 2019/0348041 | A1 * | 11/2019 | Cella | G06F 40/284 |
| 2020/0057946 | A1 * | 2/2020 | Singaraju | G06N 20/00 |
| 2020/0249918 | A1 * | 8/2020 | Svyatkovskiy | G06F 16/9027 |
| 2020/0272741 | A1 * | 8/2020 | Bhatia | H04L 63/0263 |
| 2020/0311519 | A1 * | 10/2020 | Fei | G06F 40/216 |
| 2021/0109752 | A1 * | 4/2021 | Kang | G06F 40/42 |

\* cited by examiner

*Primary Examiner* — Kevin Ky
(74) *Attorney, Agent, or Firm* — Smith, Gambrell & Russell, LLP

(57) ABSTRACT

The present disclosure relates to an ensemble network of natural language processing (NLP) models configured to determine how well a given document addresses one or more requirements set forth in a requirement-specifying document. The NLP models may extract relevant text from the documents and perform term-similarity measurements to determine how similar the text tokens from one document are to the other and generate a similarity score for each sentence and each section of each document. The similarity scores may then be used to determine whether the response document addresses the requirements. If the response document does not address particular requirements, then data flags may be generated to indicate that a corresponding section of the response document may need to be updated.

20 Claims, 17 Drawing Sheets

ENSEMBLE NATURAL LANGUAGE PROCESSING MODEL WITH COMPLIANCE VERIFICATION

CROSS-REFERENCE TO RELATED APPLICATIONS

There is no cross-reference is presented at this time.

BACKGROUND

When responding to requirements specified in certain documents, it is paramount to ensure compliance with the requirements. Traditional techniques for ensuring compliance involve multiple humans performing a manual review of each requirement's response. For example, for government contract review of Request for Proposals (RFPs), a color coded review methodology can be used, where each color is associated with a separate portion of the review of the response to the RFP. Unfortunately, for these and similar types of reviews for requirement-specifying documents, numerous individuals are needed to perform the review, which slows down the review process and inherently injects a reviewer's bias into their review of the document. Additionally, manual review of the document can still lead to a reviewer failing to identify when responses to important requirements being missed,

SUMMARY

The following is a non-exhaustive listing of some aspects of the present techniques. These and other aspects are described in the following disclosure.

Some aspects include a process that includes: obtaining a first document and a second document each comprising a plurality of sections, wherein each section of the first document comprises at least one sentence including a predefined keyword, and wherein each section of the second document comprises one or more sentences; identifying, using a first natural language processing (NLP) model, each instance of the predefined keyword in each section of the first document; for each section of the plurality of sections of the first document: extracting, using the first NLP model, first text data representing first text tokens of the at least one sentence including the predefined keyword; generating, using a second NLP model, based on the first text data, a feature vector representing each of the first text tokens of the at least one sentence including the predefined keyword to obtain a first set of textual feature vectors; for each section of the plurality of sections of the second document: extracting, using the first NLP model, second text data representing second text tokens of each of the one or more sentences of a given section of the second document; generating, using the second NLP model, based on the second text data, a feature vector representing each of the second text tokens of the given section of the second document to obtain a second set of textual feature vectors; determining, based on a term frequency-inverse document frequency (TF-IDF) analysis of each section of the first document and the second document, a set of text tokens from the first text tokens and the second text tokens that occur most frequently in the first document and the second document; selecting a set of feature vectors from the first set of textual feature vectors and the second set of textual feature vectors, wherein each feature vector selected corresponds to a text token from the set of text tokens; determining a text token similarity score between each text token from the set of text tokens, wherein determining the text token similarity score comprises computing, using a third NLP model, a first distance in a first feature space between each feature vector from the selected set of feature vectors; generating, for each section of the plurality of sections, a section text token score based on the text token similarity score for each text token of the set of text tokens included in a given section; determining, for each section of the plurality of sections, whether the section text token score satisfies a first threshold condition, the first threshold condition being satisfied for a section text token score that is greater than or equal to a threshold text token score; and generating and storing a data flag with each section of the plurality of sections of the second document having a respective threshold text token score failing to satisfy the first threshold condition.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1A:
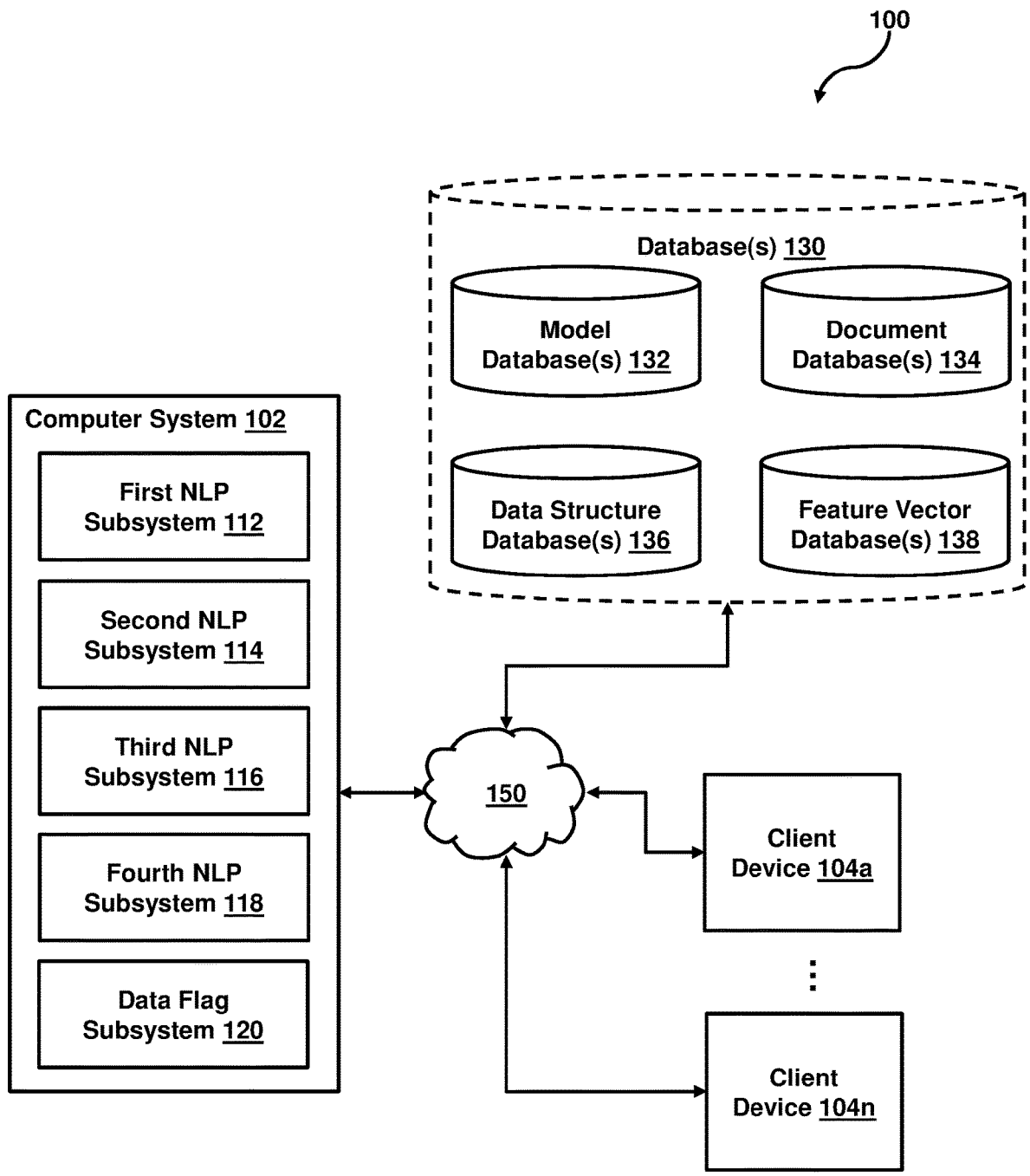
FIG. 1A illustrates an example system for using an ensemble network to perform compliance verification for a document, in accordance with various embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of speech recognition and natural language processing. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Verifying that a document complies with one or more requirements can be a challenge, particularly using traditional review techniques employing teams of humans reviewing the document. In some cases, a first document may include a number of requirements to be addressed by a second document (i.e., a "response"), and the first document may be split into a number of sections, each of which includes at least one requirement. Therefore, when preparing the response to the first document, an entity must ensure that each requirement specified in each section of the document is addressed. As the number of requirements increases, the chances of failing to provide a response to a given requirement increases. Furthermore, responses that fail to address a requirement may be deemed as non-compliant, reducing the likelihood that the response will be accepted by an entity that created the first document (e.g., the document including the one or more requirements).

Additional challenges arise when response documents are created that include low-quality responses addressing a given requirement. A low-quality response may include a response that includes vastly different terminology than that of the requirement, is semantically unrelated to the requirement, fails to include one or more key pieces of information, or a combination thereof. Certain responses may require specific details relating to regulatory constraints, safety, health data, or other information. If these responses fail to include such details, the response to the requirement may be classified as non-compliant.

The goal of the response document is to address each requirement as best as possible, addressing each of the action items specified by the requirement. Depending on how well each requirement is addressed by a corresponding response affects how well the entire response document is rated as complying with the requirements of the first (requirement-specifying) document. In some cases, a highest-rated response document may be selected as a "winner," enabling the entity that created that response document certain rights, funds, access information, or other items.

Some embodiments include an ensemble network of natural language processing (NLP) models used to analyze a first document (e.g., a requirement-specifying document) and a second document (e.g., a response document) to determine how well the second document complies with the requirements specified by the first document. If a particular requirement is not addressed by a response in the response document, or if that requirement is poorly addressed, then that response may be flagged so that it can be updated and improved. Doing so ensures that each requirement includes an optimized response, thereby improving the likelihood that the response document is selected as the "winner."

The ensemble network may include a plurality of machine learning models, such as a first machine learning model, a second machine learning model, a third machine learning model, a fourth machine learning model, or more. In some embodiments, the machine learning models may be NLP models, each trained to perform various language processing tasks. For example, one NLP model may be configured to identify a particular keyword in text. Another NLP model may be configured to extract text from a document, perform named entity recognition, perform topic modeling, or perform other tasks, or combinations thereof. Yet another NLP model may be configured to compare a require-specifying document and a response document to determine how similar text tokens from the two documents are. Still yet another NLP model may be configured to determine a semantic similarity between text tokens of the two documents. Using the ensemble network, a response document may be scored to identify a level of compliance with the requirements of the requirement-specifying document. In some cases, indications may be provided that indicate which sections of the response document, or even which responses, require additional information to improve their score and, thus, the response document's compliance with the specified requirements.

FIG. 1A illustrates an example system 100 for using an ensemble network to perform compliance verification for a document, in accordance with various embodiments. System 100 may include a computer system 102, databases 130, client devices 104a-104n (which may be collectively referred to herein as client devices 104, or which may be individually referred to herein as client device 104), and other components. Each client device 104 may include an image capturing component, an audio capturing component, an audio output component, one or more input devices, a display component, or other components. As examples, client device 104 may include one or more cameras, microphones, transducers, speakers, keyboards, keypads, touch screens, etc. In some cases, client device 104 may be communicatively coupled to one or more components. For example, a client device 104 may be wirelessly connected (e.g., via a Bluetooth connection) to a camera, keyboard, mouse, speaker, microphone, etc. In some embodiments, each of computer system 102 and client devices 104 may be capable of communicating with one another, as well as databases 130, via one or more networks 150.

Computer system 102 may include a first NLP subsystem 112, a second NLP subsystem 114, a third NLP subsystem 116, a fourth NLP subsystem 118, a data flag subsystem 120, or other components. Databases 130 may include a model database 132, a document database 134, a data structure database 136, a feature vector database 138, or other databases. Each of databases 132-138 may be a single instance of a database or may include multiple databases, which may be co-located or distributed amongst a number of server systems.

Figure 1B:
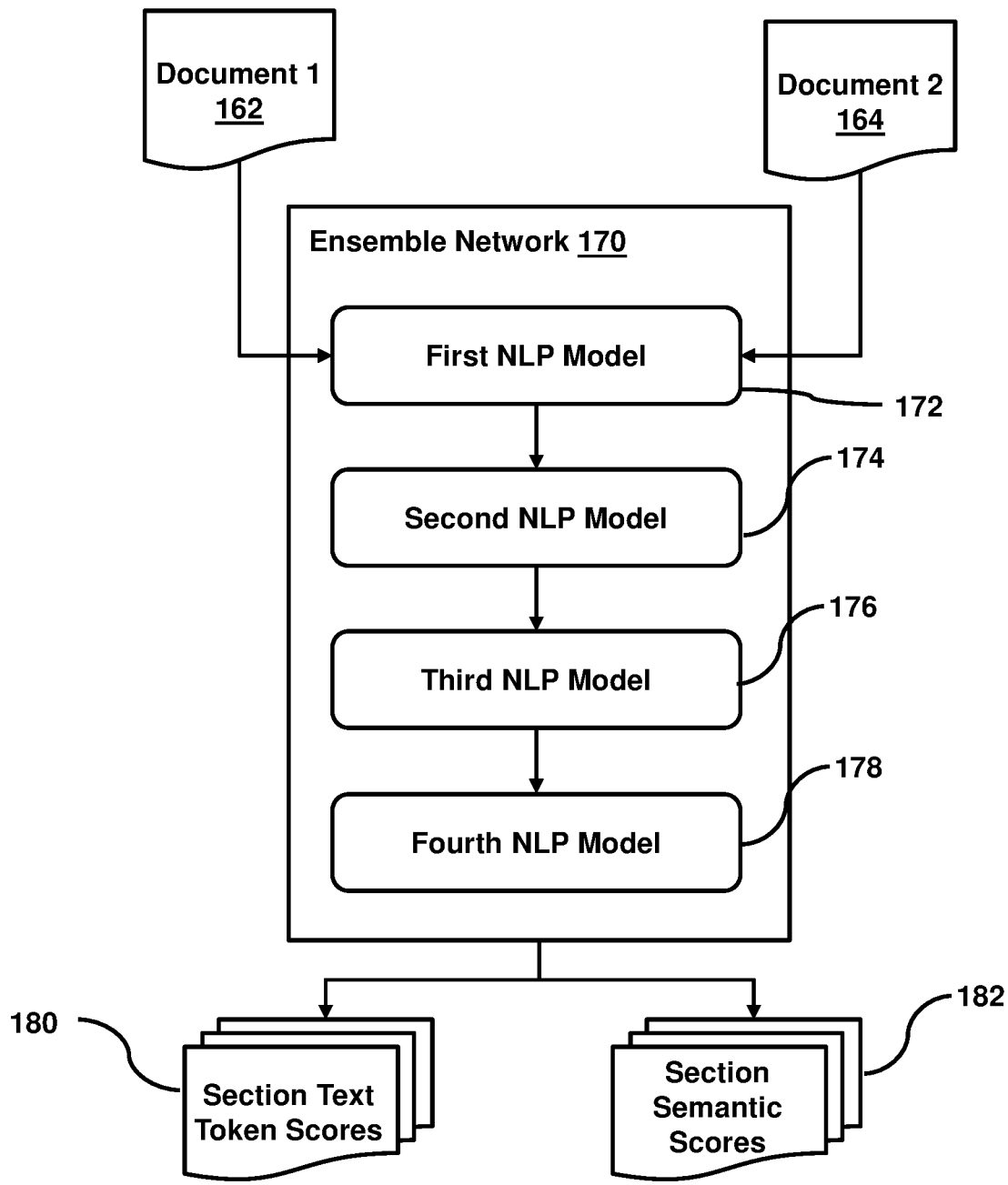
FIG. 1B illustrates an example system including an ensemble network, in accordance with various embodiments.

FIG. 1B illustrates an example system 160 including an ensemble network 170, in accordance with various embodiments. Ensemble network 170 may include multiple machine learning models joined together to perform one or more tasks, such as solving a problem. In some embodiments, ensemble network 170 includes a first NLP model 172, a second NLP model 174, a third NLP model 176, and a fourth NLP model 178. Additional machine learning models may also be enjoined to ensemble network 170, and some models may be removed or combined.

Ensemble network 170 may receive, as input, a first document 162 and a second document 164. First document 162 may be a requirement-specifying document including requirements to be addressed by second document 164. For instance, with reference to FIG. 2, document 200 corresponds to an example requirement-specifying document. Document 200 may include a plurality of sections, such as sections 202a-202c. Section 202a refers to a first section of document 200, section 202b refers to a second section of document 200, and section 202c refers to the N-th section. The number of sections, N, may vary depending on the type of document with which document 200 refers and the number of requirements included within document 200. For example, the number of sections N may be two or more sections, five or more sections, ten or more sections, one hundred or more sections, or other quantities.

Each of sections 202a-202c includes one or more sentences or phrases. In some embodiments, each section may include at least one requirement to be addressed by an entity in a response document. A requirement may be expressed as a complete or partial sentence including an instance of a predefined keyword or key phrase. The predefined keyword represents a word, n-gram, alphanumeric character string, or symbol that, if detected within an utterance, triggers an action. A similar action is triggered if a key phrase is detected within an utterance, with the exception that the key phrase represents one or more words, n-grams, alphanumeric character strings, or symbols, or a combination thereof. As an example, a predefined keyword may be the word "shall," "period," a name of a person or place, or other words, alphanumeric character strings, or symbols. In some embodiments, each requirement specified in the requirement-specifying document, document 200, is represented by a set of words, such as a sentence, where the set of words includes at least one an occurrence of the predefined keyword or key phrase.

Figure 2:
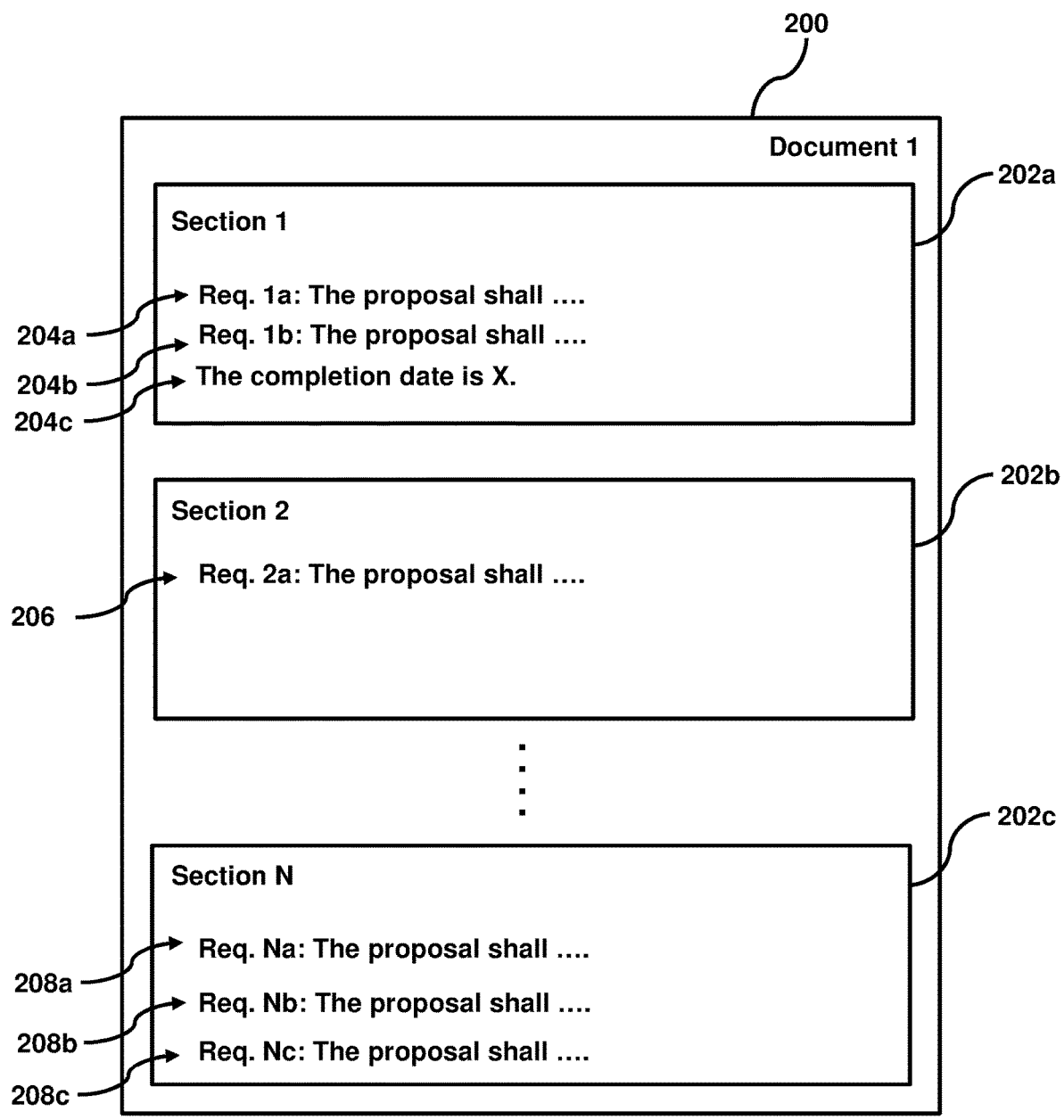
FIG. 2 illustrates an example document including a plurality of sections, each including at least one requirement, in accordance with various embodiments.

As seen in FIG. 2, first section 202a includes three sentences 204a-204c. Each of sentences 204a-204c may be a requirement or a non-requirement. For example, sentences 204a and 204b are requirements (e.g., Req. 1a and 1b), while sentence 204c is a non-requirement. In some embodiments, requirements include a requirement identifier, such as "Req. 1a," as well as a digital identifier formed of a string of numbers, letters, or characters that is used to organize and store data associated with words included in the sentence. Sentences including an occurrence of the predefined keyword may be referred to as requirement sentences. Sentences that do not include an occurrence of the predefined keyword may be referred to as non-requirement sentences. For example, sentences 204a and 204b may each include an occurrence of a keyword "shall."

Some of sections 202a-202c may include multiple requirement sentences, while other sections may include a single requirement sentence. For example, section 202a and 202c each include multiple requirement sentences, whereas section 202b includes a single requirement sentence—sentences 204a and 204b of section 202a, sentence 206 of section 202b, and sentences 208a-208c of section 202c represent example requirement sentences. Furthermore, some of sections 202a-202c may include additional sentences (e.g., non-requirement sentences) in addition to one or more requirement sentences. For example, sentence 204c of section 202a represents an example non-requirement sentence as it does not include an occurrence of the predefined keyword "shall."

Second document 164 may be a response document including responses to some or all of the requirements included in first document 162. For instance, with reference to FIG. 3, document 300 corresponds to an example response document. Document 300 may include a plurality of sections, such as sections 302a-302c. In some cases, sections 302a-302c may be the same or similar to sections 202a-202c of document 200. In other words, each section from document 300 may refer to a same section from document 200. For example, section 202a may include at least one sentence representing a requirement, and section 302a may include one or more sentences representing a response to the requirement. Therefore, document 200 and document 300 may each include N sections.

Each of sections 302a-302c includes one or more sentences or phrases. In some embodiments, the one or more sentences may form a response to a particular requirement from a corresponding section of document 200. Each sentence in a response may include one or more words, n-grams, alphanumeric character strings, symbols, or a combination thereof. It should be noted that the term, "sentence," as described herein, refers to a set of words, n-grams, alphanumeric character strings, or symbols.

Returning to FIG. 1B, first document 162 and second document 164 may be provided to first NLP model 172. In some embodiments, first NLP model 172 may be configured to identify instances of a predefined keyword within text of each section of first document 162. For example, first NLP model 172 may include a keyword spotting model, as detailed below, trained to analyze text and detect the presence of a particular keyword (e.g., "shall"). A keyword spotter, also referred to herein as a keyword spotting model, is a machine learning model configured to detect a particular keyword within an utterance. In some embodiments, the keyword spotting model is a convolutional neural network model including a sliding window that scans text of an utterance and determines, as the window moves across the text, whether the string of characters within the window matches a predefined string of characters (e.g., the keyword).

First NLP model 172 may further be configured to extract text data representing raw text from a section of first document 162. For instance, first NLP model 172 may be configured to extract text data included in each sentence having a detected occurrence of the predefined keyword. First NLP model 172 may also be configured to not extract text data associated with any sentence that does not include an occurrence of the predefined keyword. In some cases, first NLP model 172 may be configured to extract text data representing raw text from each section of second document 164.

In some embodiments, first NLP model 172 may also be configured to perform one or more pre-processing steps to first document 162 and second document 164, however alternatively, the pre-processing may be performed prior to first NLP model analyzing first document 162 and second document 164. The pre-processing steps may include parsing, tokenization, stop word removal, stemming, part-of-speech (POS) tagging, or other operations. Parsing involves segmenting text (e.g., sequences of characters or values) into subsets of text. For example, the parsing may identify each word within a given sentence. Tokenization involves classifying strings of characters into text tokens. For example, a sentence structured as, "the car drives on the road," may be represented in XML as:
  <sentence>
    <word> the </word>
    <word> car </word>
    <word> drives </word>
    <word> on </word>
    <word> the </word>
    <word> road </word>
  </sentence>.

Stop word removal involves removing stop words from the utterance. Example stop words include, but are not limited to, "the," "in," "a," and "an." Stemming involves reducing a word to its stem or root. For example, stemming of the word "running" may yield the stem "run." POS tagging involves tagging each text token with a tag indicating a part of speech that the token corresponds to. For example, POS tagging may include tagging each text token with a tag indicating whether the text token represents a noun, a verb, an adjective, etc.

After text tokens are extracted from first document 162 and second document 164, second NLP model 174 may identify words, topics, entities, or other features describing insights regarding an intent of a corresponding utterance. In some embodiments, second NLP model 174 may be configured to generate feature vectors representing the text tokens of a given sentence. The generated feature is a learned representation of individual words or terms from a text, a sentence or set of words or terms from a text, a collection of sentences or sets of words or terms from a text, or a text itself. The feature vector is an n-dimensional vector that maps to a point in a n-dimensional feature space. Other feature vectors that map to points proximate the point of the feature vector represent text tokens that are similar to the text token represented by the feature vector. For example, a feature vector representing the word "King" is directed to a point in a feature space that would be proximate another point in the feature vector related to another feature vector representing the word "Queen." The feature vectors representing text tokens from one section of document 162, and the feature vectors representing text tokens from the same section of document 164, may then be provided to third NLP model 176.

In some embodiments, a clustering quality may be determined using a clustering metric, such as an F1 score, a Normalized Mutual Information (NMI) score, or the Mathews Correlation Coefficient (MCC). In some embodiments, word embeddings for each text token may be extracted using a pre-trained deep learning network. In some embodiments, the pre-trained deep learning network may include a deep neural network having a large number of layers. For example, the deep neural network may include six or more layers. A pre-trained deep learning network may include a number of stacked neural networks each of which includes several layers. As mentioned previously, the embeddings may refer to a higher dimension representation of a discrete variable where the number of dimensions is less than, for example, a number of characters in a text string. Using the pre-trained deep learning network, a word embedding may be extracted for each text token, sentence, section, etc. The word embedding may be a representation of a term and may be generated using different models for different aspects. In some embodiments, the word embedding may be represented as a tensor. For example, an embedding tensor of rank 1 may refer to an embedding vector composed of an array of numbers (e.g., a 1 by N or N by 1 vector). The dimensionality of an embedding vector may vary depending on use case, for instance the embedding vector may be 32 numbers long, 64 numbers long, 128 numbers long, 256 numbers long, 1024 numbers long, 1792 numbers long, etc. The word embeddings mapped to a word embedding space may describe a relationship between text tokens. A word embedding space is specific to a model that generates the textual feature vectors for that word embedding space. In some embodiments, the spatial relationship between two (or more) word embedding vectors in embedding space may provide details regarding a relationship of the corresponding text tokens, particularly for use cases where a training data set includes a sparse amount of data.

Third NLP model 176 may be configured to determine how well represented each text token from the section of document 162 is within the same section of document 164. In some cases, third NLP model 176 may additionally determine how well represented each text token from one section of document 162 is within each section of document 164, and vice versa. In some embodiments, third NLP model 176 computes a text token similarity score between pairs of text tokens, one from first document 162 and one from second document 164. Using the text token similarity scores, a section text token score may be computed for each section to obtain section text token scores 180.

Fourth NLP model 178 may be configured to determine how semantically similar two text tokens are, two sentences are, two sections are, two documents are, or a combination thereof. Fourth NLP model 178 may generate semantic similarity scores indicating how similar two tokens are and, based on the semantic similarity scores for the text tokens, compute a section semantic score for a given section. Section semantic scores 182 representing the semantic similarity score of each section of first document 162, second document 164, or both.

Figure 4A:
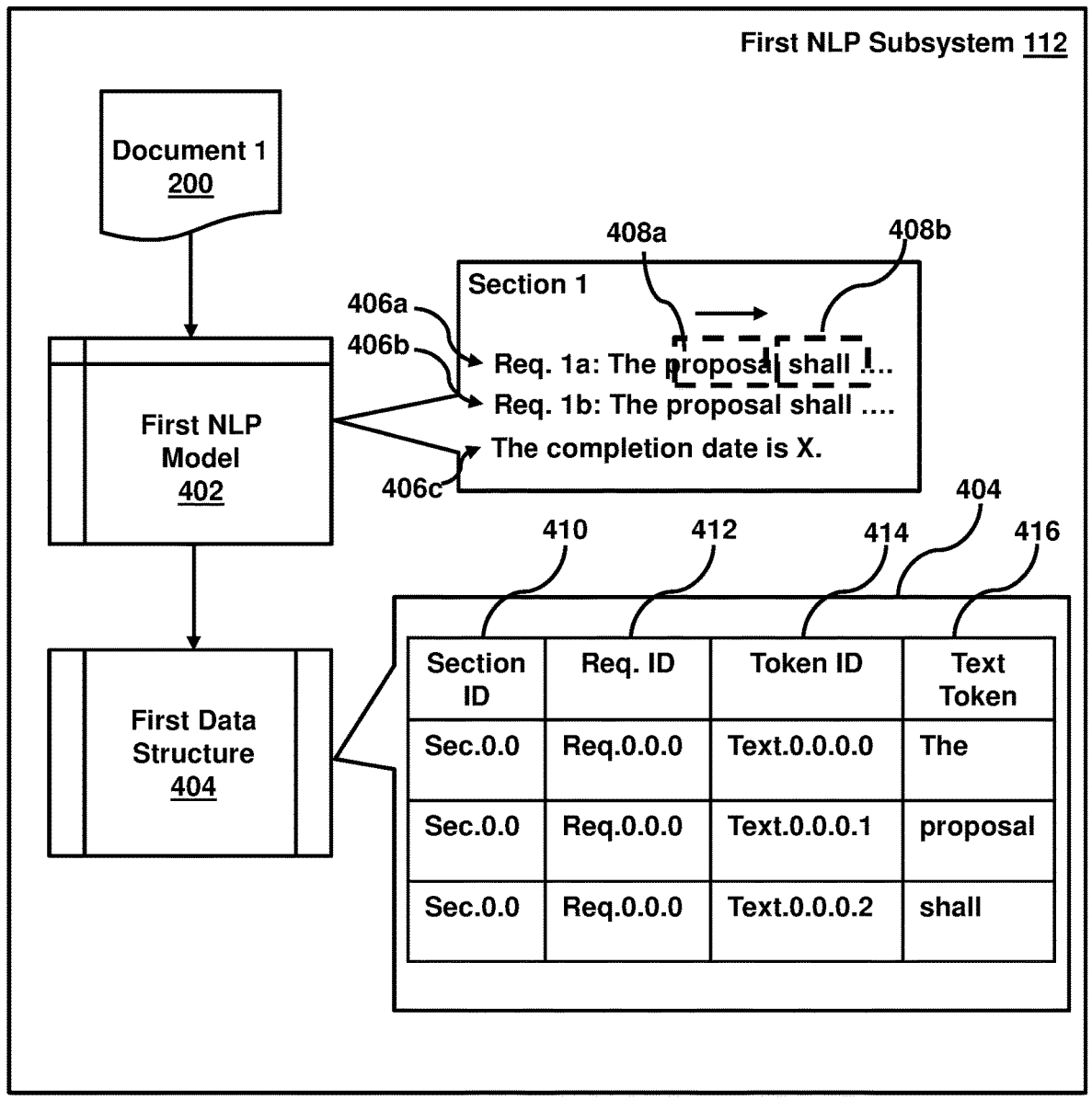
FIGS. 4A and 4B illustrate an example first natural language processing (NLP) subsystem configured to generate a data structure for a first document and a second document, respectively, in accordance with various embodiments.
Figure 4B:
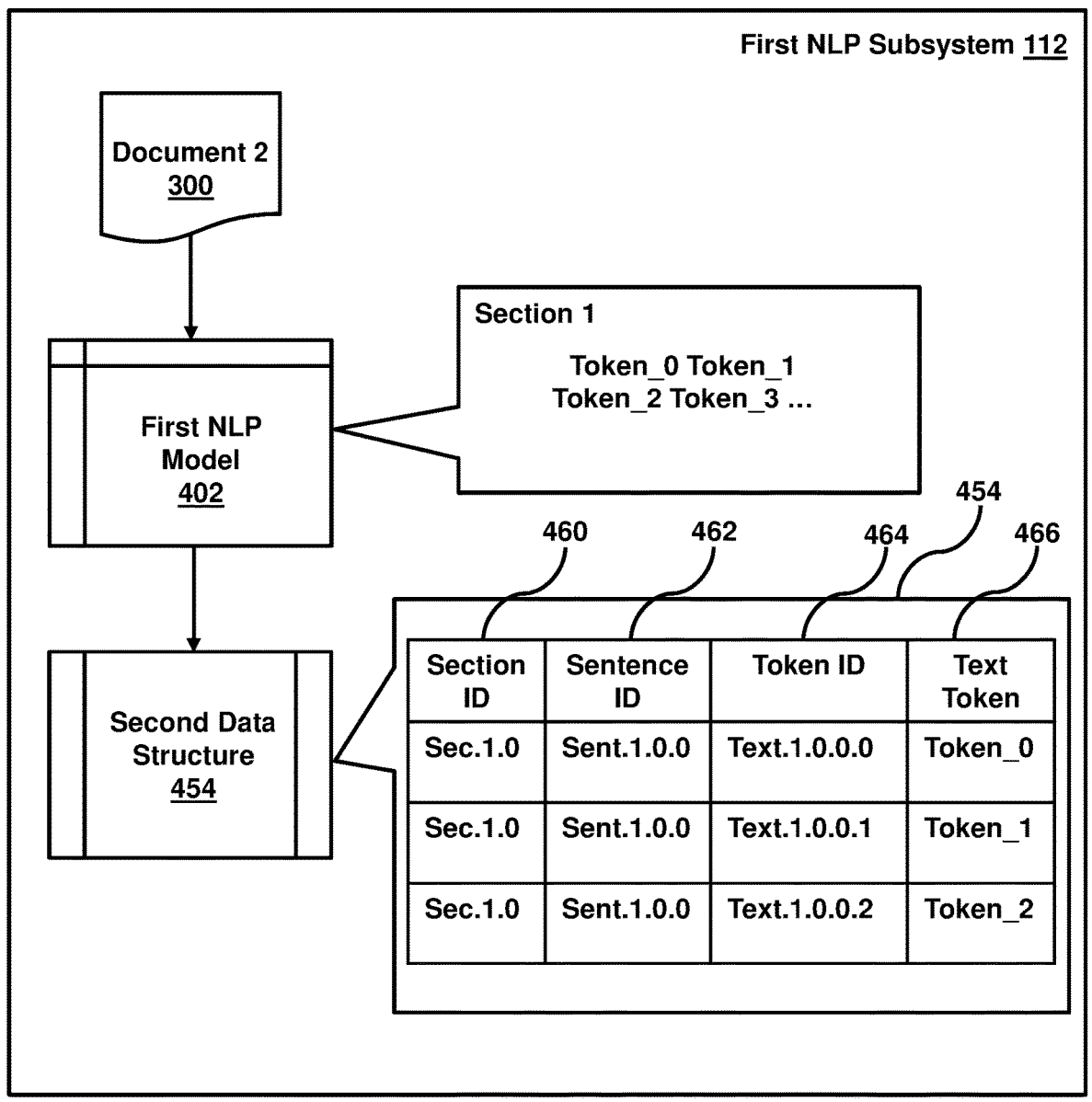

FIGS. 4A and 4B illustrate an example first natural language processing (NLP) subsystem configured to generate a data structure for a first document and a second document, respectively, in accordance with various embodiments. In some embodiments, first NLP subsystem 112 is configured to obtain a first document, document 200 of FIG. 2, as seen in FIG. 4A. Upon receiving document 200, first NLP subsystem 112 may provide, as input, document 200 to a first NLP model 402.

First NLP model 402 may be configured to identify occurrences of a predefined keyword in text from each section of document 200. For example, first NLP model 402 may detect each occurrence of a keyword "shall" in each sentence of each section of document 200. First NLP model 402 may include a keyword spotting model. A keyword spotting model, which can also be referred to as a trigger spotting model, analyzes an utterance to determine whether a predefined keyword has been uttered. In some cases, the keyword spotting model may be implemented using convolutional neural network that applies a moving window of a fixed size to an utterance to detect whether the predefined keyword is present. The moving window may move in "steps," referring to a number of characters in the string of text that the window is to move in one direction. At each step, the moving window performs a comparison between the subset of characters included in the fixed window and the predefined keyword. When the comparison indicates a high likelihood (e.g., a confidence score of greater than 90%) that the candidate subset of characters represents the predefined keyword, the keyword spotting model can output a signal indicated that the keyword has been detected, and one or more additional actions may be performed.

As an example, with reference to FIG. 4A, first NLP model 402 causes window 408a to move from left to right across the utterance corresponding to Req. 1 (e.g., "The proposal shall . . . "). If the moving window is set at 5 characters in size, the window will analyze a candidate token including the first five characters (e.g., "the p") and determine how similar those characters are to a predefined keyword (e.g., "shall"). If the candidate token's characters are determined to be not represent the predefined keyword (e.g., Score=("The p"|"shall")<Threshold), then first NLP model 402 may cause window 408a to move to the right (for languages read left to right) a predetermined number of characters, referred to as the "step." For example, the step size may be four characters, and so after analyzing the first fiver characters (e.g., "the p"), first NLP model 402 may analyze another five characters starting from the fifth character in the utterance's text string (e.g., "propo"). This process may repeat until a determination is made as to whether the utterance includes an instance of the predefined keyword. For example, moving window 408b includes the characters "shall." First NLP model 402 may compare the candidate characters "shall" to the predefined keyword "shall," and determine a similarity score. If the similarity score exceeds a preset threshold, then first NLP model 402 may declare that the predefined keyword has been detected within the utterance. In some embodiments, the size of window 408a, 408b may be configurable such that different sized window are used for different utterances (or even the same utterance), the size of the step may be configurable such that different step sizes are used for different utterances (or the same utterance), or both. As described herein, an utterance refers to a word, words, sentence statement, or sound, or combination thereof. The utterance may be spoken (e.g., audio signals capturing spoken sounds) or textual (e.g., a sentence or sentences). For example, as seen in FIG. 4A, each requirement included within document 200 may be expressed as a sentence including an identifying label "Req." followed by one or more additional identifying characters (e.g., "1a," "1b," etc.). In some embodiments, however, document 200 may not include an identifying label. Thus, first NLP model 402 may analyze each sentence from document 200 to detect instances of the predefined keyword.

In some embodiments, in addition to identifying instances of a predefined keyword within each sentence included in each section of first document 200, first NLP model 402 may be configured to populate a first data structure 404 with data based on text data representing one or more sentences included in a given section of first document 200. In response to first data structure 404 being populated, first NLP subsystem 112 may provide first data structure 404 to data structure database 136 for storage. Data structure database 136 may store each populated data structure with metadata indicate a time that the data structure was generated, information (e.g., a directory path, document identifier, URL, pointer, etc.) for a corresponding document that the data structure was populated from, a client device that the corresponding document was obtained from (and subsequently stored in document database 134), or other information.

In response to detecting the predefined keyword within a sentence of a given section of document 200, first NLP subsystem 112 may be configured to extract text data representing the sentence from first document 200. For example, text data representing a sentence 406a including an instance of a predefined keyword (e.g., "shall") may be extracted by first NLP subsystem 112 in response to first NLP model 402 indicating that sentence 406a includes the predefined keyword. In some embodiments, first NLP subsystem 112 extracts text data represented each sentence that is determined to include the predefined keyword (e.g., sentences 406a and 406b), however text data related to sentences that do not include the predefined keyword (e.g., sentence 406c) may not be extracted. Some embodiments extract separate text data for each sentence that includes the predefined keyword. For example, if a first sentence and a second sentence each include an instance of a predefined keyword, first text data representing the first sentence and second text data representing the second sentence may each be extracted by first NLP subsystem 112. However, alternatively, first NLP subsystem 112 may extract text data representing both the first sentence and the second sentence.

In some embodiments, first NLP subsystem 112 may perform one or more additional processes steps to the text data representing the sentences in order to speed up the analysis of the text data. For example, first NLP subsystem 112 may, upon receipt of first document 200, parse first document 200 to identify each string of characters included therein. The parsing may be performed in conjunction with, or in addition to, a tokenization process whereby blocks of the raw text data included within first document 200 is split into individual sentence and word "text tokens." In some embodiments, the tokenization process may also include assigning a section identifier, a requirement identifier, and a token identifier to each text token. As mentioned above, first document 200 includes a plurality of sections, and each section includes at least one sentence having an occurrence of a predefined keyword. The at least one sentence can be referred to as a requirement.

In some embodiments, first NLP subsystem 112 may assigned a section identifier to each text token, where text tokens extracted from a given section are assigned that section's corresponding section identifier. For example, text tokens for each of sentences 406a-406c, which are included in the first section of first document 200, may be assigned a section identifier "Sec.0.0," where the first "0" refers to first document 200, and the second "0" refers to the first section.

In some embodiments, first NLP subsystem 112 may assigned a requirement identifier to each text token, where text tokens extracted from a given requirement are assigned that requirement's corresponding requirement identifier. For example, as sentence 406a includes an instance of a predefined keyword (e.g., "shall"), sentence 406a may represent a first requirement included within the first section of first document 200. Thus, each text token included within sentence 406a may be assigned a requirement identifier "Req.0.0.0," where the first two "0"s refer to first document 200 and the first section of first document 200, respectively, and the third "0" refers to the first requirement (e.g., a first instance of a sentence including the predefined keyword).

In some embodiments, first NLP subsystem 112 may assign a text token identifier to each text token within each requirement (e.g., a sentence including the predefined keyword) for each section of first document 200. For example, sentence 406a includes the text tokens "The," "proposal," "shall," etc. Each of these text tokens may be assigned a unique text token identifier indicating that text token's position within the corresponding sentence. For instance, the text token "The" may be assigned the text token identifier "Text.0.0.0.0," where the first three "0"s refer to first document 200, the first section of first document 200, and the first requirement of the first section of first document 200, respectively, and the fourth "0" refers to a text token position of that text token. The text token "proposal" may be assigned the text token identifier "Text.0.0.0.1," indicating it is the second text token in the corresponding sentence.

Based on the aforementioned identification techniques, first NLP subsystem 112 may implement first NLP model 402 to extract text data from first document 200 and populate first data structure 404 with values. As mentioned above, first data structure 404 may include a section identifier column 410, a requirement identifier column 412, a text token identifier column 414, and a text token column 416. Each field in data structure 404 may be populated with a value associated with a given text token such that first data structure 404 includes a structured representation of first document 200, which can be used downstream in ensemble network 170 for further analysis.

Figure 3:
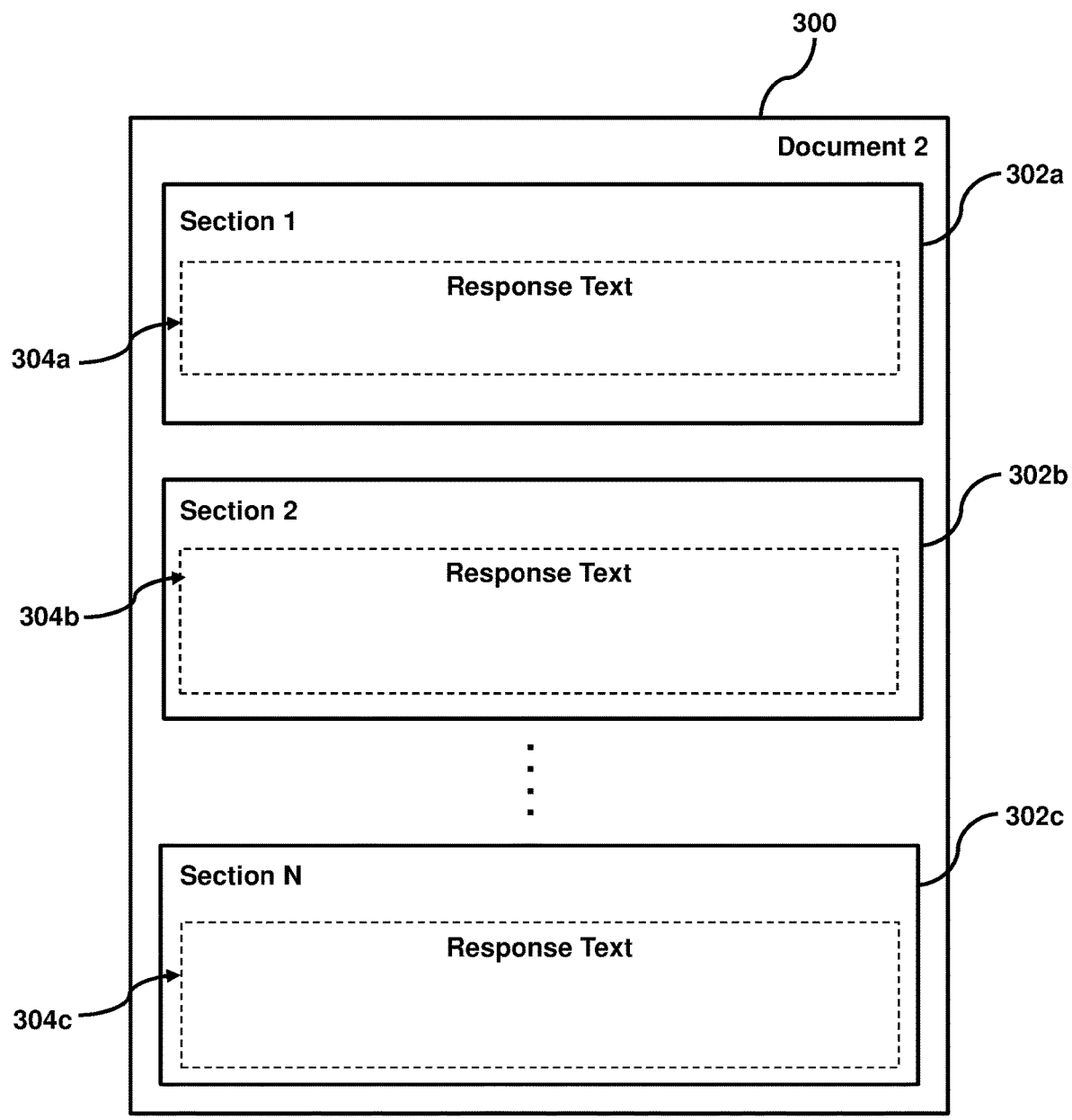
FIG. 3 illustrates an example document including a plurality of sections, each including a response to the at least one requirement, in accordance with various embodiments.

In some embodiments, first NLP subsystem 112 is further configured to obtain a second document, document 300 of FIG. 3, as seen in FIG. 4B. Upon receiving document 300, first NLP subsystem 112 may provide, as input, document 300 to first NLP model 402. First NLP model 402 may be configured to perform similar tasks to document 300 as performed to document 200, with the exception that document 300 may refer to a response document including responses to some or all of the requirements specified by first document 200. First NLP model 402 may cause a second data structure 454 to be populated based on the tasks performed to the raw text data included within second document 300. In some cases, second data structure 454, in response to being populated, may be stored in data structure database 136. Data structure database 136 may store each populated data structure with metadata indicate a time that the data structure was generated, information (e.g., a directory path, document identifier, URL, pointer, etc.) for a corresponding document that the data structure was populated from, a client device that the corresponding document was obtained from (and subsequently stored in document database 134), or other information. As mentioned above, second document 300 may also include a plurality of sections, which may be the same as the plurality of sections included by first document 200. As an example, each section of second document 300 includes sentences forming a response to each requirement including withing a same section of second document 300. However, in some embodiments, the sentences included in each section of document 300 do not need to include the predefined keyword in order to trigger extraction of the text day representing those sentences.

In some embodiments, first NLP model 402 may extract text data representing each sentence included in each section of second document 300. The raw text data included within second document 300 may be parsed into text tokens each corresponding to a given text token. For example, consider the sentence "Token_0, Token_1, Token_2, Token_3, . . . " included within the first section of second document 300. First NLP model 402 may perform a tokenization of the sentence to obtain the text tokens "Token_0," "Token_1," "Token_2," "Token_3," etc. Each text token may be assigned a section identifier indicating the section of second document 300 that the sentence including that text token was included within, a sentence identifier indicating which of the sentences included in the text token, and a unique text token identifier indicating a position of the text token within the sentence.

As an example, second data structure 454 includes a section identifier column 460, a sentence identifier column 462, a token identifier column 464, and a text token column 466. In this example, text token "Token_0" may have a section identifier "Section.1.0," a sentence identifier "Sent.1.0.0," and a token identifier "Text.1.0.0.0." The "1" in section identifier "Sec.1.0," indicates that data structure 454 is populated based on second document 300, and the "0" indicates that the text token for that entry is from the first section of document 300. Text token "Token_0" may have a sentence identifier "Sent.1.0.0," where the first two digits, "1," "0," respectively indicate that the text token was extracted from second document 300 and the first section of second document 300, and the third "0" refers to the text token being extracted from the first sentence of the first section of second document 300. Text token "Token_0" may be assigned the token identifier "Text.1.0.0.0," where the first three digits, "1," "0," "0" refer to the text token being extracted from second document 300, the first section of second document 300, and the first sentence of the first section of second document 300. The fourth digit, "0," indicates that the text token is the first word in the first sentence of the first section of second document 300.

In some embodiments, first NLP subsystem 112 may perform one or more additional speech processing steps to the raw text data, the tokenized text data (e.g., text data representing each text token, text data representing a set of text tokens, text data representing all of the text tokens, etc.), the raw text data and the tokenized text data, or other forms or versions of text data, or combinations thereof. For example, first NLP subsystem 112 may perform stop word removal to the text tokens to remove any stop words that are present. Some example stop words include, but are not limited to, (which is to not imply that other lists are limiting), "the," "in," "an," "what," etc. A stop word is a word that helps while reading, but whose removal does not impact the critical concepts and terms of the sentence. In some embodiments, each data structure (e.g., data structures 404, 454) may include a column including a flag, binary bit (e.g., logical 1, 0), or other indicator that classifies a given text token as being a stop word or not being a stop word. This may allow first NLP subsystem 112 to filter out which text tokens are not to be used for additional natural language processing (e.g., text tokens having an indicator specifying that the text tokens are stop words).

As another example, first NLP subsystem 112 may perform stemming to reduce a particular word to its word stem. For instance, a stem of the word "running" is "run." The resulting stemmed terms may be used for additional natural language analysis further along the pipeline of ensemble network 170. In some embodiments, each data structure (e.g., data structures 404, 454) may include a column indicating the text token and an updated or revised text token corresponding to a stemmed version of the text token, if stemmed. When performing later natural language processing, the stemmed version of the text tokens may be used to help speed up the computation time making the comparison of text tokens consistent. For example, if one text token is "running" and another is "ran," a text token level similarity would indicate that these two text tokens represent different words. However, when stemmed, both text tokens become "run," and thus the text tokens really have a high-level of similarity that would not be determined without stemming.

As still yet another example, first NLP subsystem 112 may perform tagging which categorizes and assigns (tags) each text token with a part-of-speech (POS) tag indicating which part of speech the text token refers to. In other words, tagging identifies whether a given text token represents a noun, a verb, a proper noun, an adjective, or the like. In some embodiments, first NLP model 402 may be further configured to determine the POS tag for a given text token. First NLP model 402 may be trained based on training data including a large number (e.g., 1,000,000 or more) words each including a tag indicating the POS the words corresponds to. In some embodiments, each data structure (e.g., data structures 404, 454) may include a column indicating the POS tag assigned to a text token.

In some embodiments, a support vector machine (SVM) may be trained with a training data to obtain a trained model for performing feature extraction. In some embodiments, a classifier may be trained using extracted features from an earlier layer of first NLP model 402 (or other models included in ensemble network 170).

Figure 5:
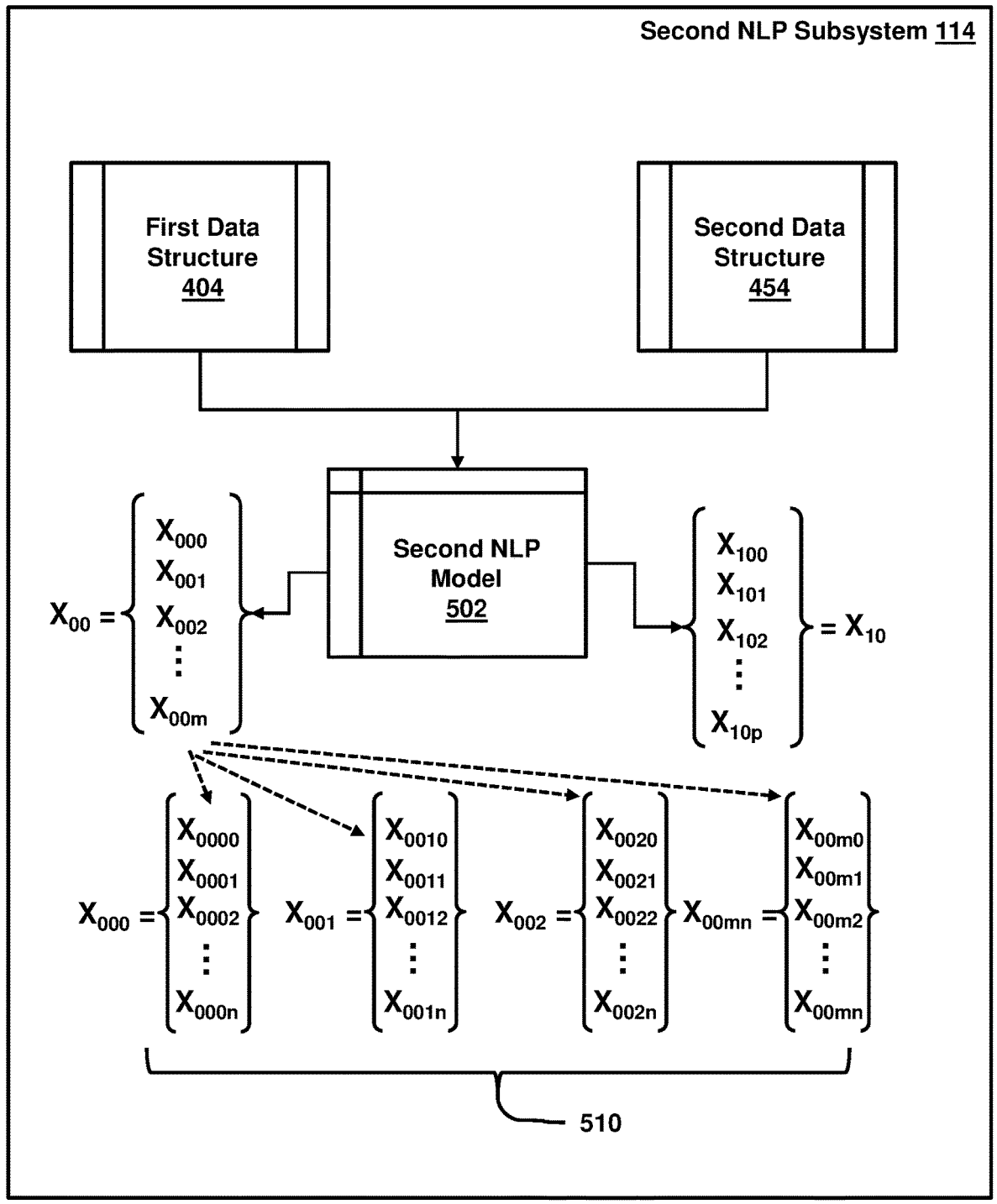
FIG. 5 illustrates an example second NLP subsystem configured to generate a set of textual feature vectors, in accordance with various embodiments.

FIG. 5 illustrates an example second NLP subsystem 114 configured to generate a set of textual feature vectors, in accordance with various embodiments. Second NLP subsystem 114 may obtain first data structure 404 and second data structure 454. Data structures 404 and 454 may be obtained from first NLP subsystem 112 or from data structure database 136. In some embodiments, first and second data structures 404 and 454 may be obtain in parallel, sequentially, or in a different order. Additionally, while the aforementioned includes two data structures, additional data structures may also be processed by second NLP subsystem 114 in parallel or sequentially.

Some embodiments include second NLP subsystem 114 causing first data structure 404 and second data structure 454 to be provided, as input, to a second NLP model 502. Second NLP model 502 may be trained to generate a feature vector representing each text token included within each sentence of each section of each document. The feature vectors for each text token may be concatenated to obtain a feature vector representing a given sentence from a section of each document (e.g., first and second documents 200 and 300), a feature vector representing some or all of the sentences from a given section of each document, a feature vector representing some or all sections of a given document, or other feature vectors.

In some embodiments, second NLP model 502 may be configured to perform named entity recognition for the text tokens. Named entity recognition (NER) refers to a process of associated a text token with a pre-classified entity (e.g., a named entity) such that a given token has a meaning identifiable to computer system 102. A downstream process called named entity resolution, or entity resolution, may be configured to link a given text token to a specific known entity. For example, the text token "Atlanta," may be resolved to the named entity "Atlanta" corresponding to the city in Georgia, whereas the text token refers to a string of alphanumeric characters with no computer-processed meaning. NER and entity resolution processing may utilize gazetteer information, such as for matching text results with different entities (e.g., titles, names, places, etc.).

In some embodiments, second NLP model 502 may further be configured to generate word embeddings for the text tokens. Word embeddings refer to learned representations of individual words or terms that are processable by computer system 102. Some example machine learning models that may be used to generate word embeddings, and may be implemented as, or a portion of, second NLP model 502, include, but are not limited to, (which is not to imply that other lists are limiting), Word2Vec, Continuous Bag-of-Words (CBOW) model, Continuous Skip-Gram Model, Global Vectors for Word Representations (GloVe) model, Latent Semantic Analysis (LSA), Bert, or other machine learning models. Second NLP model 502 generates a vector representation (e.g., a feature vector) of a given text token based on the resolved entity, the POS, other text tokens in the sentence, other text tokens in the section, or other information. Each feature vector may be n-dimensions in size, where each dimension refers to a feature of the word. The number of dimensions of the feature vector may be defined by second NLP model 502. For instance, a feature space for second NLP model 502 may be 50 or more dimensions, 100 or more dimensions, 1,000 or more dimensions, or more.

In some embodiments, second NLP model 502 may generate a set of textual feature vectors 510 representing each text token from a given sentence of a given section of a document. In some cases, the text tokens represented by set of textual feature vectors 510 are stemmed text tokens where stop words have already been removed. However, alternatively, the text tokens may include unstemmed text tokens, stop words, or both. In some embodiments, second NLP model 502 may generate a feature vector for each document, for each section, for each sentence, for each word, or for other subdivisions of a document. For instance, as seen with reference to FIG. 5, second NLP model 502 may generate a feature vector $X_{00}$ and another feature vector $X_{10}$. For example, feature vectors $X_{00}$ and $X_{10}$ respectively represent a feature vector of the first section of first document 200 and second document 300. Feature vector $X_{00}$ may be an m-dimensional vector including m elements, and feature vector $X_{10}$ may be a p-dimensional vector including p elements, where m and p can be equal or not equal. Each element in feature vectors $X_{00}$ and $X_{10}$ refers to a value associated with another feature vector representing a sentence from that section. For example, feature vector $X_{00}$ may include elements $\{X_{000}, X_{001}, X_{002}, \ldots, X_{00m}\}$, where element $X_{000}$ is associated with a feature vector representing a first sentence from a first section of first document 200, element $X_{001}$ is associated with a feature vector representing a second sentence from the first section of first document 200, and the like. Continuing the example, the feature vector $X_{000}$, representing the words included in the first sentence of the first section of first document 200, may include n-elements, where each element represents a feature vector of the corresponding word. For instance, feature vector $X_{000}$ may include elements $\{X_{0000}, X_{0001}, X_{0002}, \ldots, X_{000n}\}$, where element $X_{0000}$ is associated with a feature vector representing a first word in a first sentence from a first section of first document 200, element $X_{0001}$ is associated with a feature vector representing a second word in the first sentence from the first section of first document 200, and the like. In some embodiments, upon being generated, some or all of the feature vectors may be stored in feature vector database 138. For example, set of textual feature vectors 510, including feature vectors representing each word in a first sentence of first document 200, may be stored in feature vector database 138.

Figure 6A:
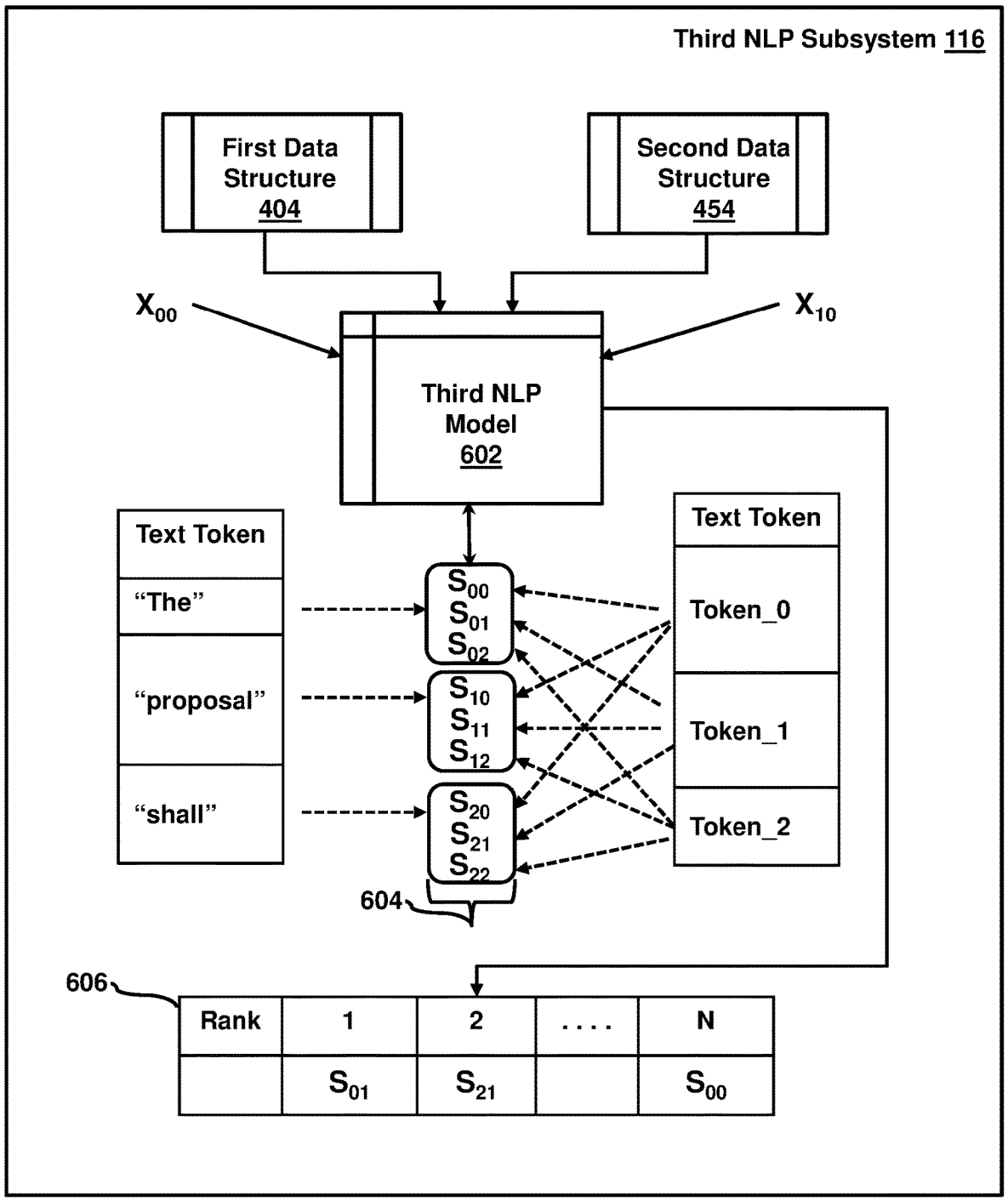
FIG. 6A illustrates an example third NLP subsystem configured to generate and rank text token scores, in accordance with various embodiments.

FIG. 6A illustrates an example third NLP subsystem 116 configured to generate and rank text token scores, in accordance with various embodiments. In some embodiments, third NLP subsystem 116 may be configured to obtain data structures, feature vectors, or both, from a database (e.g., data structure database 136, feature vector database 138), or other subsystems of computer system 102, and provide, as input, the data structures and/or feature vectors to a third NLP model 602. Third NLP model 602 may be configured to determine how well each requirement from first document 200 is addressed by a corresponding section from second document 300. For example, as mentioned above, first document 200 includes a first section having a first requirement, labeled "Req. 1a." Some embodiments expect a response to the first requirement to be included within the first section of second document 200. Therefore, third NLP model 602 determines whether the first section of second document 300 includes a suitable response to the first requirement specified in the first section of first document 200.

In some embodiments, third NLP model 602 may compute a set of text token similarity scores 604 that indicate how similar each text token from a requirement is to each text token from a corresponding section of a response document. For example, the first requirement of the first section of first document 200 recites a sentence, "The proposal shall . . . ," and the first section of second document 300 includes one or more sentences, "Token_0, Token_1, Token_2 . . . ." In order to determine how well the sentences of the first section of second document 300 address the first requirement, a similarity score may be computed between each text token from the two documents. For instance, third NLP model 602 may compare the first word, "The," to each text token from the first section of second document 300. Third NLP model 602 may output text token similarity scores indicating how similar a pair of text tokens are to one another. For example, text token similarity score $S_{00}$ indicates how similar the text tokens "The" and "Token_0" are to one another.

In some embodiments, the text token similarity scores for a text token from a requirement and each text token included in a corresponding section of a response document may be combined to determine an overall text token similarity score for that text token. As an example, for text token "proposal" of the first requirement of the first section of first document 200, third NLP model 602 may compute text token similarity scores $S_{10}$, $S_{11}$, $S_{12}$, which respectively indicate a similarity between the text token "proposal" and each of the text tokens "Token_0, Token_1, Token_2." In some cases, the overall text token similarity score for the text token "proposal" may be computed by combining $S_{10}$, $S_{11}$, and $S_{12}$.

In some embodiments, in addition to or instead of computing text token similarity scores 604, third NLP model 602 may generate a ranking of each text token from each requirement included within each section of first document 200. For instance, third NLP model 602 may output a ranking of text token similarity scores 606, which ranks text token similarity scores for each section. The text token similarity scores may be computed, as described above, by combining an individual text token similarity score for each text token in one requirement's sentence (e.g., a sentence including the predefined keyword) of first document 200 with each of the text tokens in a corresponding section of second document 300. The resulting overall text token similarity score may indicate, for a given section, how significant a particular text token is. Some embodiments include averaging each individual text token score for a given requirement sentence to obtain an overall text token similarity score for that requirement.

In some embodiments, third NLP model 602 may perform a term frequency-inverse document frequency (TF-IDF) analysis between first document 200 and second document 300. TF-IDF is a measure of how frequently a given text token appears in a document (or a section of a document) against how important that word is to other documents in a corpus (or sections in the document) being analyzed. As an example, third NLP model 602 may determine the term frequency (TF) based on how frequently a text token from a requirement sentence of a first section of first document 200 appears in an entirety of first document 200, and may determine the inverse document frequency (IDF) based on how frequently the text token appears in first document 200 and second document 300. In some embodiments, third NLP model 602 may compute the TF-IDF for each text token based on each set of textual feature vectors computed for first document 200 and second document 300. Third NLP model 602 may determine a significance score for each text token based on the results of the TF-IDF analysis, outputting ranking of text token similarity scores 606 indicating which text tokens are "most significant" (e.g., which text tokens have a greatest TF-IDF score).

In some embodiments, responsive to identifying the most significant text tokens in each section of first document 200 and second document 300, third NLP subsystem 116 may compute a statistical similarity score for pairs of terms from the identified most significant text tokens. For example, if text tokens T1-T10 were identified as being the most significant text tokens across first document 200 and second document 300, then third NLP subsystem 116 may retrieve (or construct) a feature vector for each of text tokens T1-T10, and compute a text token similarity score for the text tokens. Text token T1, for example, may be compared to text tokens T2, T3, . . . , T10 to obtain text token similarity scores S12-S19, text token T2 may be compared to text tokens T1, T3, T4, . . . , T10, and so on, to obtain text token similarity scores for pairs of text tokens in a given section of each document.

Figure 6B:
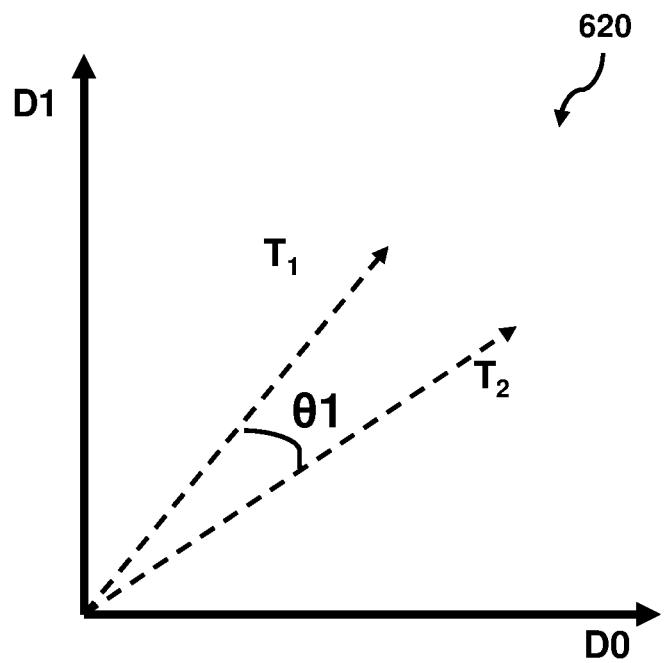
FIG. 6B illustrates an example graph depicting a distance between feature vectors representing text tokens and determining a similarity of the text tokens based on the distance, in accordance with various embodiments.

In some embodiments, the text token similarity score refers to a distance between two feature vectors in a feature space formed based on the dimensionality of the text token feature vectors. As an example, with reference to FIG. 6B, the feature vector for text token T1 may be compared to the feature vector for text token T2. Graph 620 of FIG. 6B depicts that a distance between the feature vectors text tokens T1 and T2 is angle $\theta 1$. Therefore, the text token similarity score S12 between text tokens T1 and T2 may be determined based on angle $\theta 1$. In some embodiments, the distance between two feature vectors, as shown in FIG. 6B, refers to a Euclidian distance, an L2 distance, a cosine distance, a Minkowski distance, a Hamming distance, or any other vector space distance measure, or a combination thereof.

Based on the text token similarity scores, third NLP subsystem 116 may determine whether a given requirement from a section of first document 200 has been addressed by a corresponding section of second document 300. For example, if a particular text token from a requirement sentence of a first section of first document 200 is determined to be dissimilar from the most significant text tokens identified from the first section of second document 300, then this may indicate that the first section of second document 300 needs to be updated. Based on the analysis by third NLP model 602, third NLP subsystem 116 may output a set of text token similarity scores for each of the most significant text tokens identified by the TD-IDF analysis.

Figure 7A:
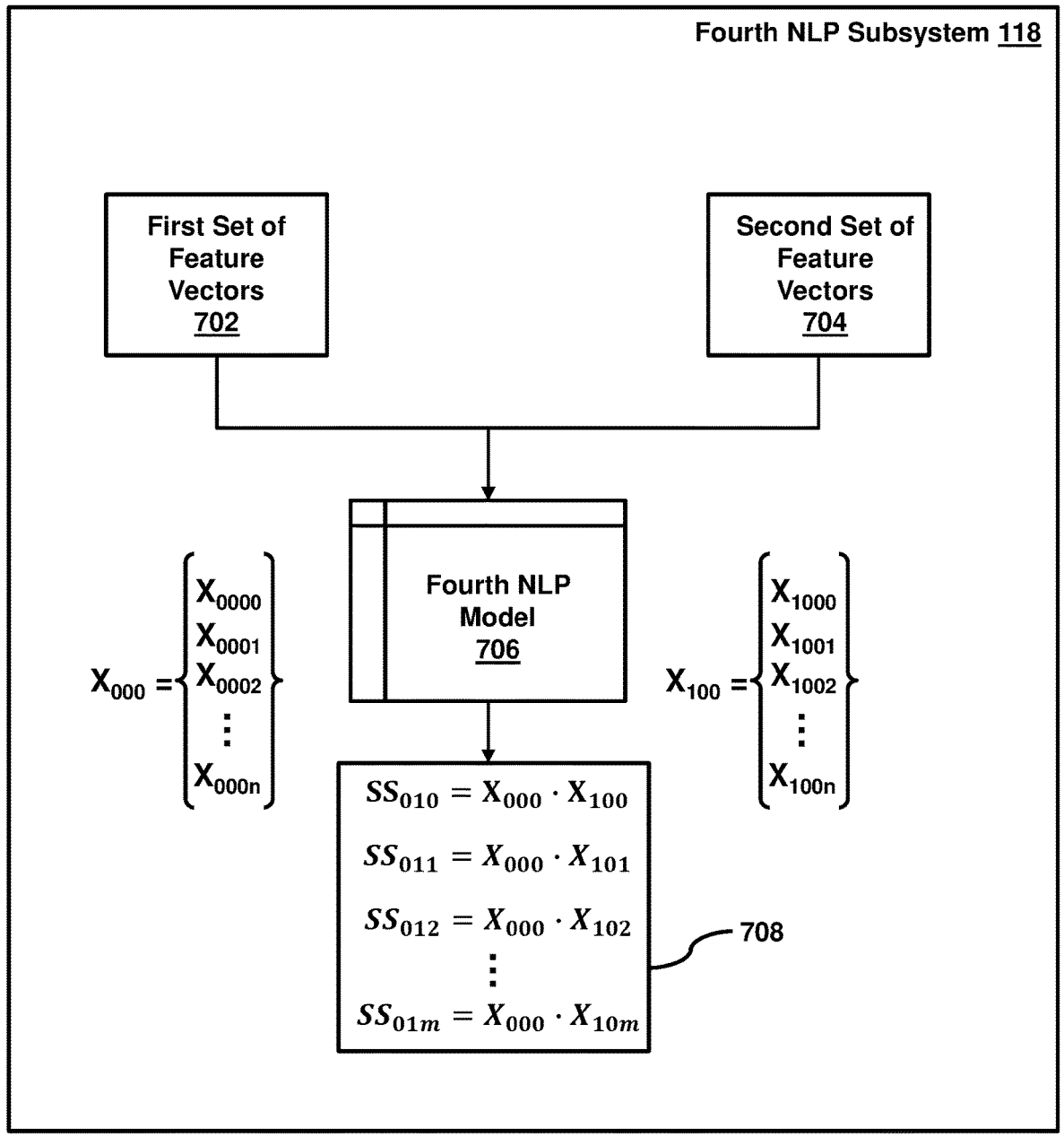
FIG. 7A illustrated an example fourth NLP subsystem configured to generate semantic similarity scores for text tokens, in accordance with various embodiments.

FIG. 7A illustrated an example fourth NLP subsystem 118 configured to generate semantic similarity scores for text tokens, in accordance with various embodiments. Fourth NLP subsystem 118 may obtain a first set of feature vectors 702 and a second set of feature vectors 704 from feature vector database 138, one of the other subsystems of computer system 102, a combination thereof, or from other sources. In some cases, fourth NLP subsystem 118 may generate first and second sets of feature vectors 702 and 704. First set of feature vectors 702 includes a plurality of feature vectors representing the text tokens included in a requirement and/or a section of first document 200. Alternatively, first set of feature vectors 702 may include feature vectors representing text tokens included in multiple sections of first document 200. In this scenario, each feature vector can include section identifiers to indicate within which section the corresponding text token was included. Second set of feature vectors 702 may include feature vectors representing text tokens included in a section of second document 300, however second set of feature vectors 704 may also include feature vectors representing text tokens included in other sections of second document 300 as well. In the latter scenario, each feature vector may include section identifiers indicating within which section the corresponding text token was included.

Fourth NLP subsystem 118 may implement a fourth NLP model 706, which takes, as input, first set of feature vectors 702 and second set of feature vectors 704, and outputs semantic similarity scores indicating how semantically similar text tokens from a given section of first document 200 are to text tokens from that same section of second document 300. In some embodiments, fourth NLP model 706 may determine a semantic similarity of the N most common text tokens from first document 200 and second document 300, and may determine the semantic similarity between those N-most common text tokens.

A semantic similarity score refers to a score that indicates how similar a first word's meaning is to a second word's meaning, a first sentence's meaning is to a second sentence's meaning, a first document's meaning is to a second document's meaning, and the like. To compute the semantic similarity score, fourth NLP model 706 may determine a meaning of one text token, a meaning of another token, and determine how similar those two meanings are. Fourth NLP model 706 may further determine how similar an individual text token is to a set of text tokens, or how similar a set of text tokens is to another set of text tokens.

Performing the semantic similarity analysis may include performing word sense disambiguation and relationship extraction. Word sense disambiguation refers to a process whereby a meaning is attributed to a text token. Certain words may have different meanings differentiable only by the context of the other words. For example, the word "ball" can refer to a spherical object or a formal dance party. Which meaning is attributed to the word depends on the other words in the sentence. Semantic analysis includes various subprocesses, including identifying hypernyms and hyponyms, homonyms, synonyms, antonyms, as well as other semantic analysis processes, or combinations thereof. Relationship extraction refers to a process where semantic relationships between words within text are detects. For example, for the sentence, "Jack lives in California," the entities "Jack" and "California" are related to one another.

To perform semantic analysis, the meaning of each lexical item from a sentence is determined. Lexical items refer to words, sub-words, n-grams, phrases, etc., whose underlying meaning is determined. In some embodiments, lexical items within a document (e.g., a sentence, sentences, sections of a document, a document, etc.) are identified and the lexical items are classified into different categories. Fourth NLP model 706 may include a classification model, which is also referred to as a classifier, that determines whether a given lexical item is associated with one or more predefined categories. The classifier may be configured to output a vector representing how related each lexical item is to one of the predefined categories. Furthermore, fourth NLP model 706 may be configured to identify relationships between entities recognized within text. For example, if one entity within a sentence represents a person's name and another sentence represents a name of a company, fourth NLP model 706 may determine that these two entities have a relationship to one another based on predetermined contextual relationship information, which indicates how closely related two or more different entities are. For instance, the predetermined contextual relationship information may indicate that an entity resolved to be a city is related to another entity, "State," which is related to yet another entity, "Country," and so on. The category information and the entity relationship information may be used by fourth NLP model 706 to determine how semantic similar two text tokens are.

In some embodiments, fourth NLP model 706 generates a semantic similarity score between text tokens from a corresponding section of first document 200 and second document 300. For example, fourth NLP model 706 may determine how semantically similar text tokens from a first sentence of a first section of first document 200 are to text tokens from one or more sentences of the first section of second document 300. In some cases, feature vector $X_{000}$ and feature vector $X_{100}$ respectively correspond to a feature vector representing each text token included in a first sentence from the first section of first document 200, where the first sentence includes the predefined keyword, and a feature vector representing each text token included in the sentences from the first section of second document 300. In some embodiments, the text tokens referenced by feature vectors $X_{000}$ and $X_{100}$ have had stop words removed, have been stemmed, or have had additional or alternative speech processes performed thereto. Feature vector $X_{000}$ may include n-elements, $X_{0000}, X_{0001}, \ldots, X_{000n}$, where each element refers to a feature vector of the n-th term from the sentence of the first section of first document 200, and feature vector $X_{100}$ may include n-elements, $X_{1000}, X_{1001}, \ldots, X_{100n}$, where each element refers to a feature vector of the n-th term from the sentences in the first section of second document 300. In some embodiments, the number of elements in feature vector $X_{000}$ and $X_{100}$ differ.

To determine how semantically similar two feature vectors are, fourth NLP model 706 may compute a semantic similarity score based on a distance between the two feature vectors in a feature space. In some embodiments, the feature vectors included in first set of feature vectors 702 and second set of feature vectors 704 encode semantic information about the text token or tokens represented by a corresponding feature vector. The semantic information may include a semantic meaning of a term, relationship information between entities represented by the text tokens, or other information used for determining how semantically similar two terms are. As mentioned above, determining the semantic similarity score between two text tokens, two sets of text tokens, or other terms, may include determining a distance between two feature vectors in the feature space defined by fourth NLP model 706. As an example, with reference to FIG. 7B, graph 720 indicates that a distance between feature vector $X_{000}$ and $X_{100}$ in a feature space defined by dimensions D0 and D1, may be angle θ2. In some embodiments, the semantic similarity score may be determined based on the distance (e.g., angle θ2). Computing the distance between feature vectors may include computing a Euclidian distance, an L2 distance, a cosine angle, or other metrics, or combinations thereof.

In some embodiments, fourth NLP model 706 may output a set of semantic similarity scores 708. Each semantic similarity score output indicates how semantically similar two feature vectors are. The semantic similarity scores may be numerical values between 0.0 and 1.0, where semantic similarity scores closer to 1.0 refer to feature vectors that represent semantically similar text tokens, while semantic similarity scores closer to 0.0 refer to feature vectors that represent semantically dissimilar text tokens.

In some embodiments, the semantic similarity scores for each text token in each requirement sentence (e.g., a sentence including the predefined keyword) of a section of first document 200 may be combined to generate a section semantic score for a given section. As an example, the semantic similarity scores for each requirement sentence may be averaged together to obtain an average semantic similarity score for a particular section. A same or similar process may be performed for second document 300, where the semantic similarity scores for each text token in the sentences of a section of second document 300 may be combined to generate a section semantic score for the section. As an example, the semantic similarity scores for the sentences included in a first section of second document 300 may be averaged together to obtain an average semantic similarity score for the first section.

Figure 8:
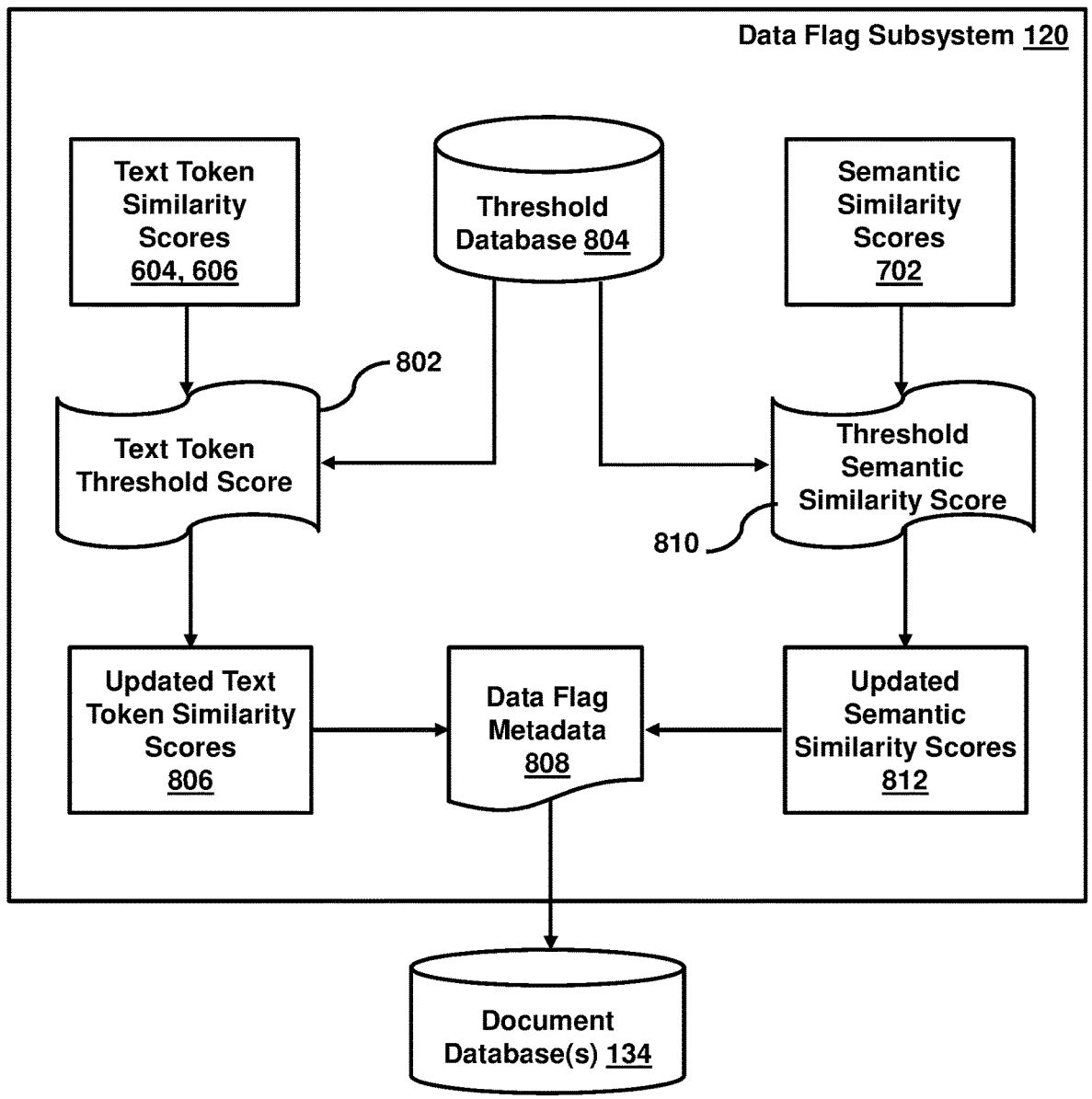
FIG. 8 illustrates an example data flag subsystem for determining whether a data flag is to be assigned to a section of a document to indicate whether the section does not comply with one or more requirements of a corresponding section from a first document, in accordance with various embodiments.

FIG. 8 illustrates an example data flag subsystem 120 for determining whether a data flag is to be assigned to a section of a document to indicate whether the section does not comply with one or more requirements of a corresponding section from a first document, in accordance with various embodiments. In some embodiments, data flag subsystem 120 may determine whether a set of text token similarity scores satisfies a text token similarity threshold condition. The text token similarity threshold condition can be satisfied if a text token similarity score is greater than or equal to a text token similarity threshold score. The text token similarity threshold score may be predefined or dynamically configurable, and indicates whether a given text token in a section of first document 200 is represented well enough by the corresponding section from second document 300. As an example, the text token similarity threshold score may be a numerical value between 0.0 and 1.0, such as 0.7, 0.8, 0.9, 0.95, or other values. To determine whether the text token similarity threshold condition is satisfied, a text token similarity threshold score for a text token may be compared to the text token similarity threshold score to determine whether the text token similarity score is greater than or equal to the text token similarity threshold score. If so, then that text token may be classified as being "well represented" within a corresponding section of second document 300. However, if the text token similarity score is less than the text token similarity threshold score, then that text token may be classified as being "not well represented" within the corresponding section of second document 300.

Some embodiments text token similarity scores 604 and/or text token similarity scores included in ranking of text token similarity scores 606 or other sets of text token similarity scores are analyzed to determine whether they satisfy the text token similarity threshold condition. As mentioned above, the text token similarity scores indicate how similar a text token included within a sentence of a section of first document 200 is to text tokens included within sentences of the same section of second document 300. In some embodiments, the text tokens analyzed represent the most significant text tokens (e.g., text tokens having a highest text token similarity score). However, in some embodiments, all of the text token similarity scores may be analyzed to determine whether they satisfy the text token similarity threshold condition.

Figure 9:
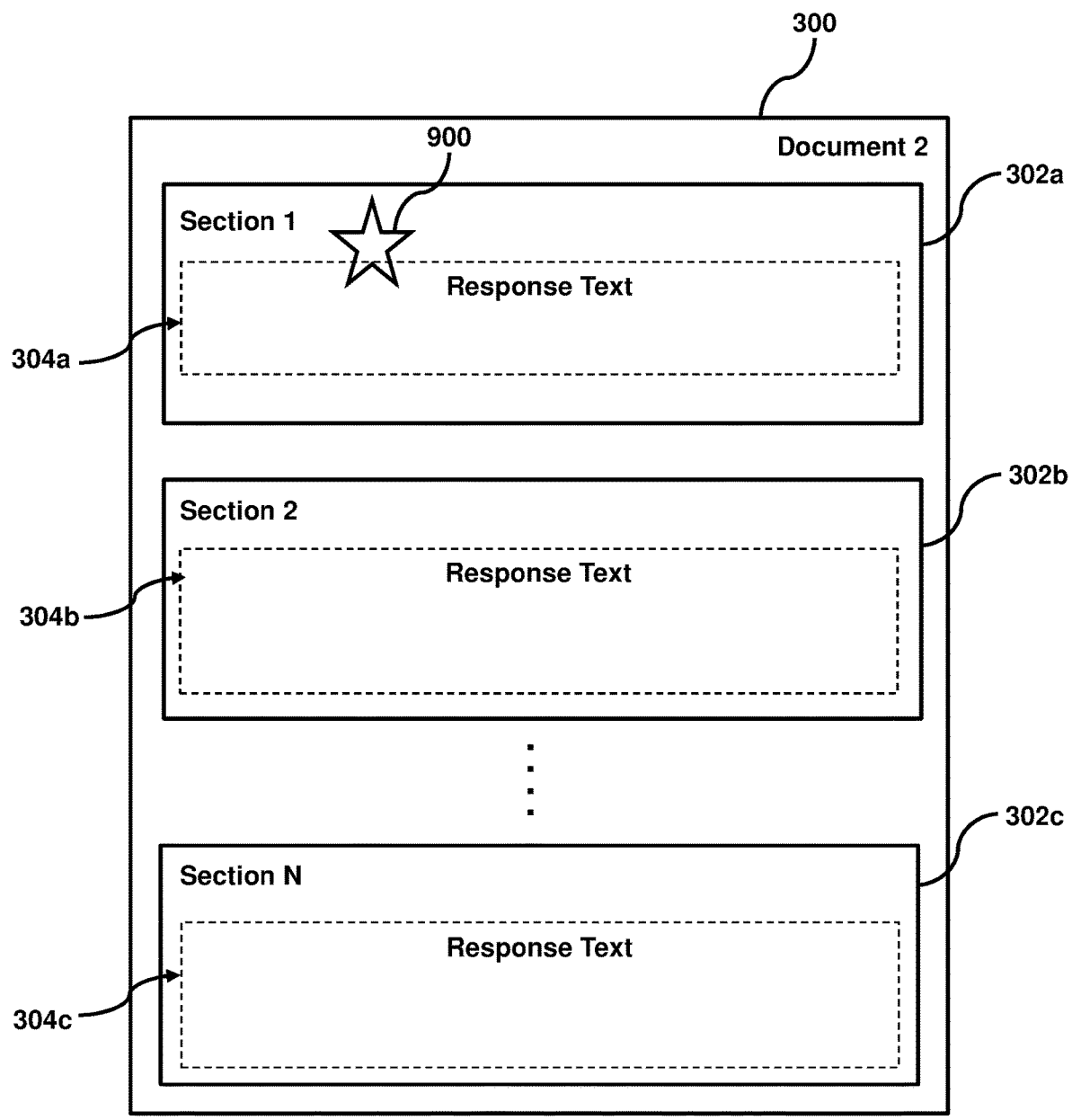
FIG. 9 illustrates an example document including a plurality of sections including a response to the at least one requirement and an indicator associated with the assigned data flag, in accordance with various embodiments.
Figure 10A:
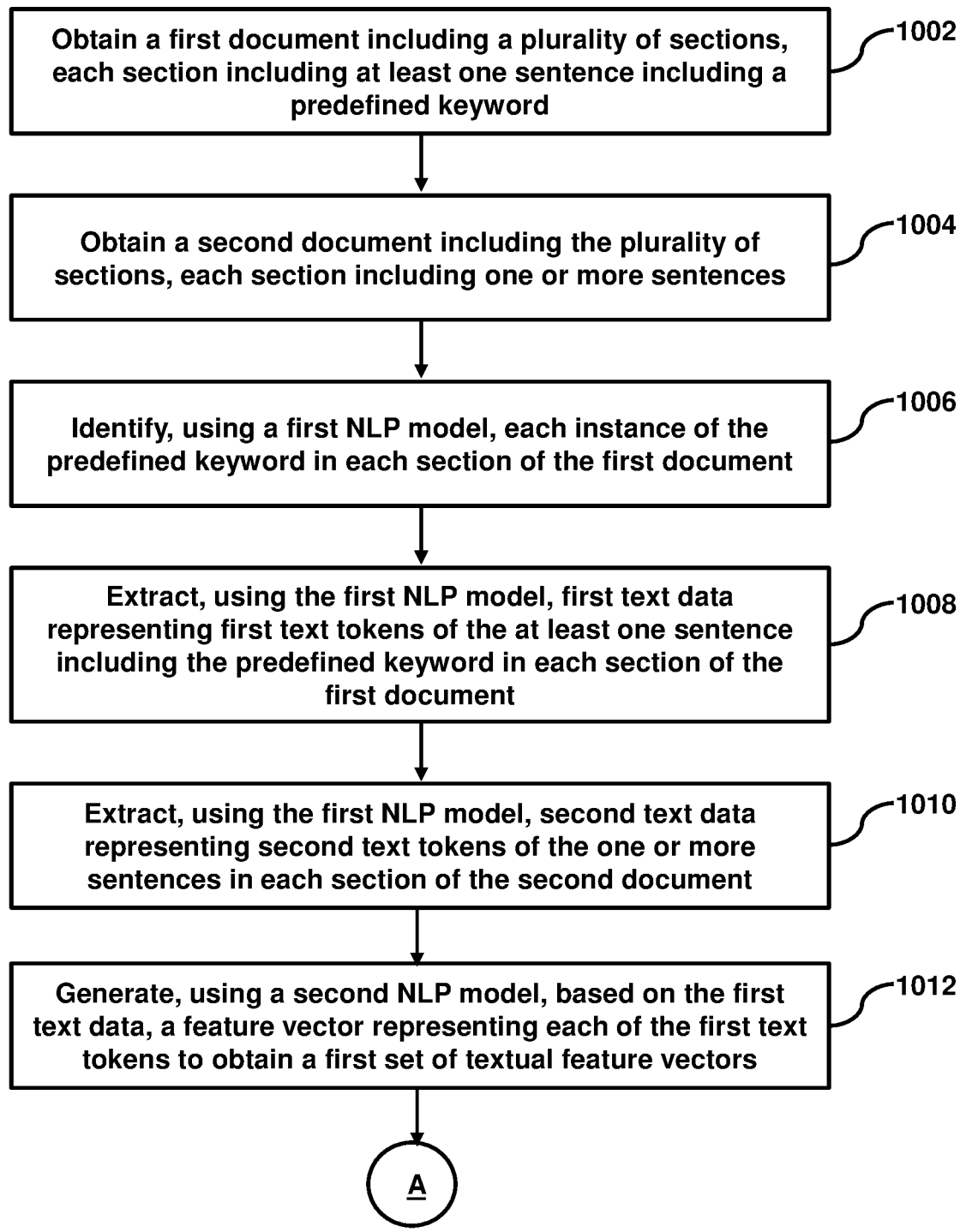
FIGS. 10A-10D illustrate an example process for determining whether one or more sections of a first document comply with at least one requirement of a corresponding section from a second document, in accordance with various embodiments.
Figure 10B:
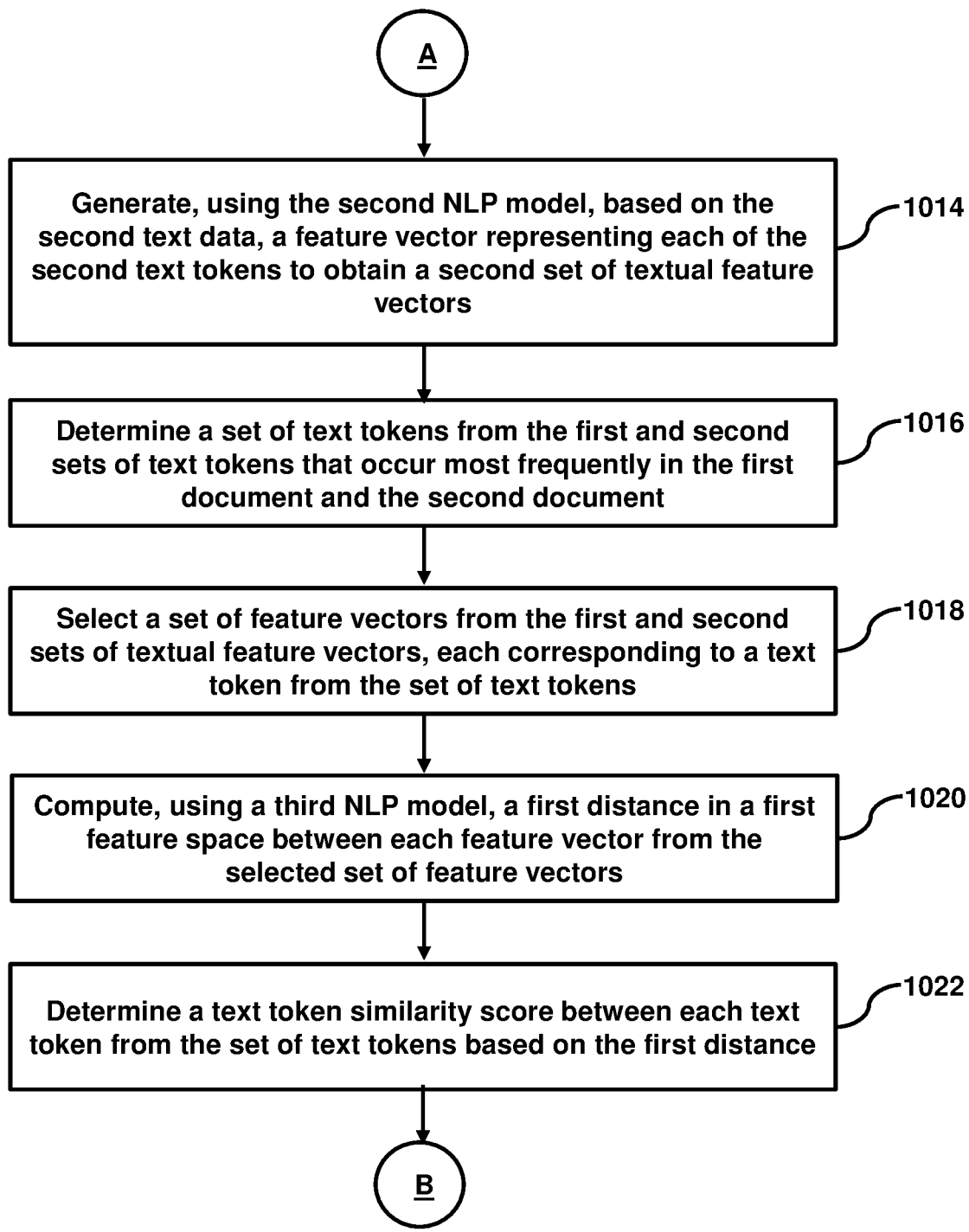
Figure 10C:
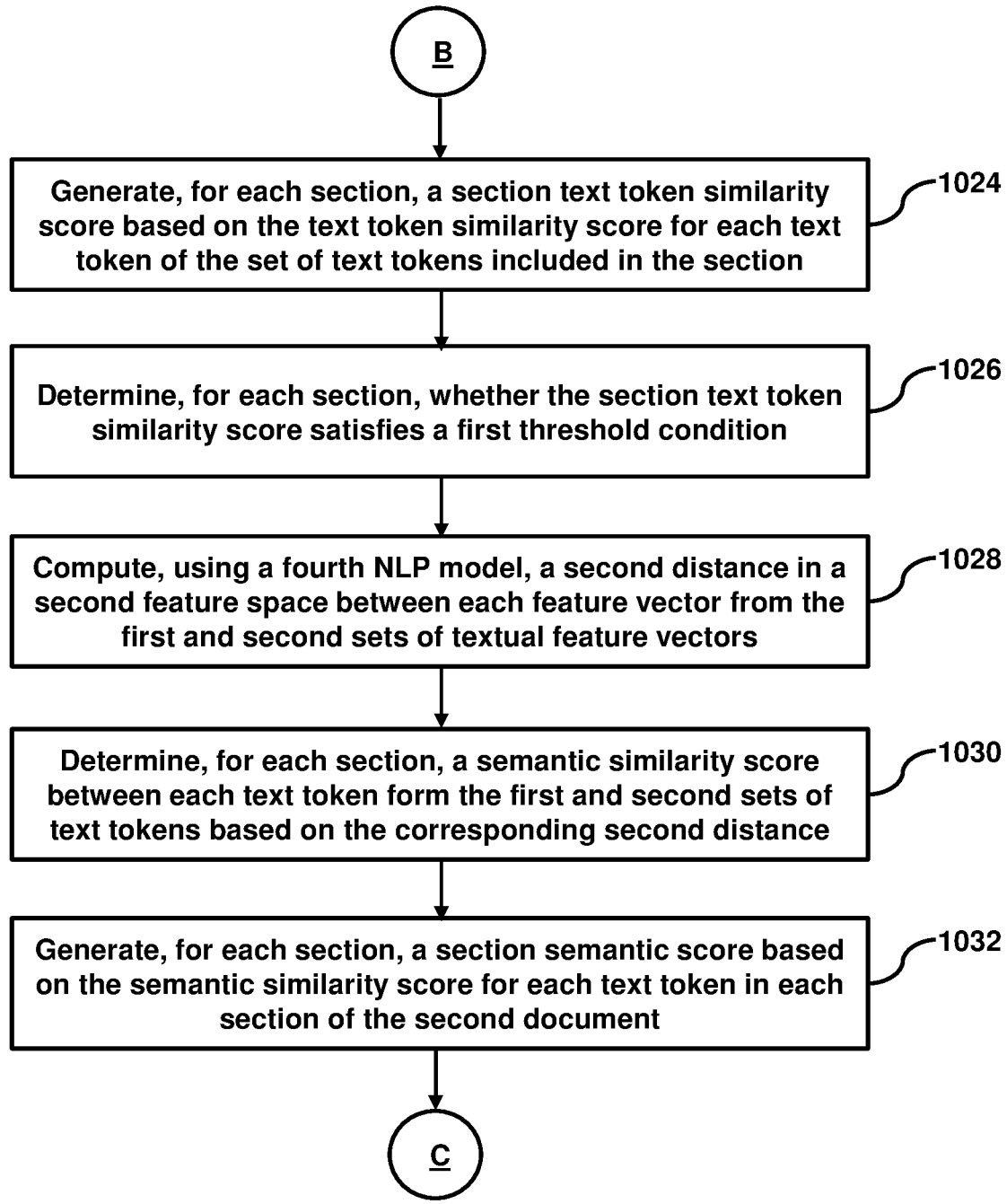
Figure 10D:
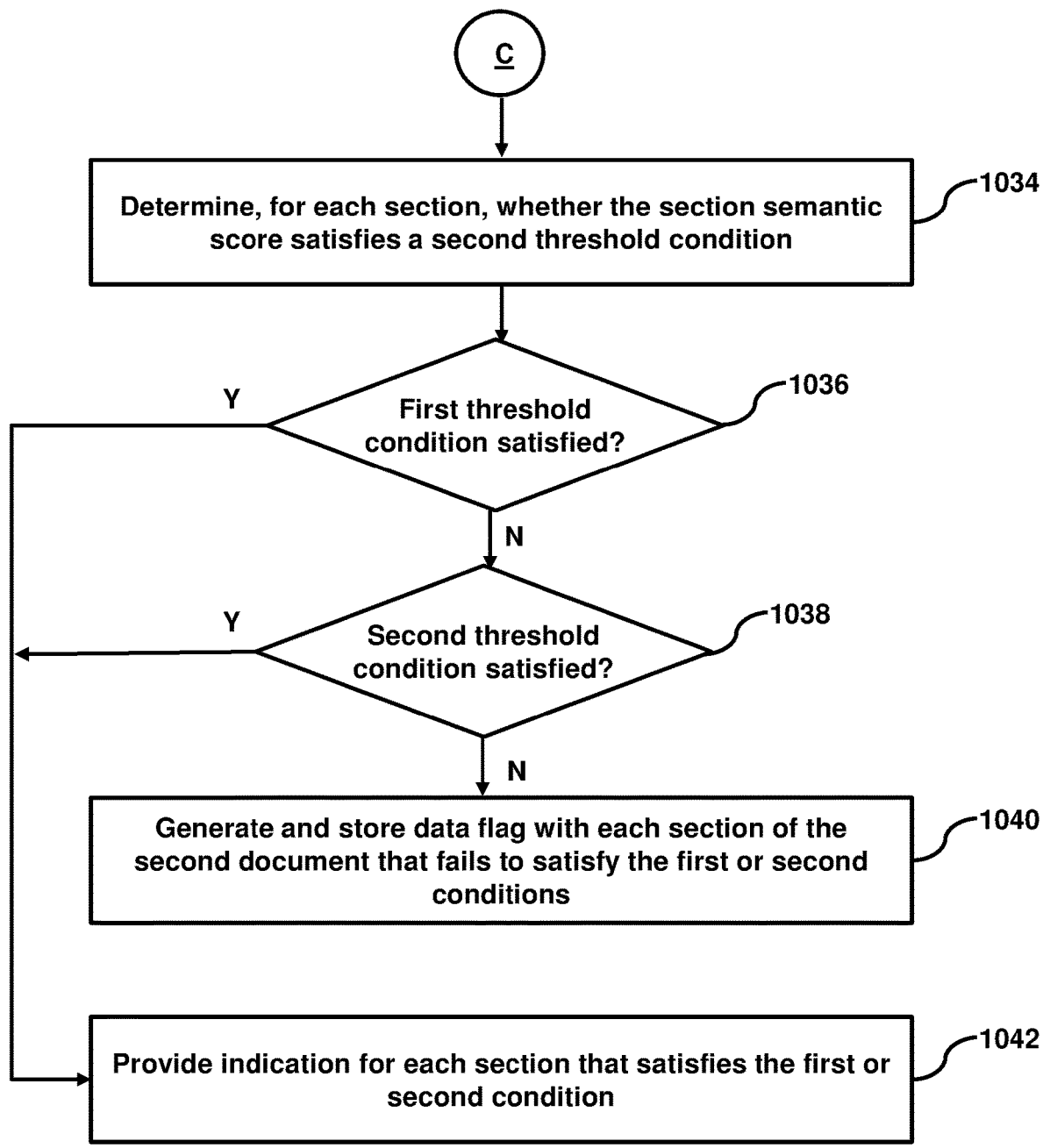

Data flag subsystem 120 may compare each text token similarity score to a text token threshold score to determine whether that text token similarity score satisfies the text token similarity threshold condition. The text token threshold score may be predefined or configurable, and may be stored in threshold database 804. Different text token threshold scores may be used for different documents. Additionally, different text token threshold scores may be used based on how stringent the compliance between first document 200 and second document 300 are desired to be. For example, larger text token threshold scores (e.g., text token similarity threshold scores greater than or equal to 0.75, 0.85, 0.95, or other values) may cause more compliant response documents and/or sections of response documents to be identified, whereas lower text token threshold scores (e.g., text token similarity threshold scores less than or equal to 0.35, 0.25, 0.15, or other values may identify less compliant response documents and/or sections of the response documents. Data flag subsystem 120 may generate updated text token similarity scores 806 based on whether text token similarity scores 604, 606 satisfied the text token similarity threshold condition. For example, text tokens having text token similarity scores that are greater than or equal to text token threshold score 802 may have their updated score remain the same as before. In other words, if a text token similarity score S is greater than a text token similarity threshold score $S_{threshold}$, then updated text token similarity scores 806 may store the score S as the updated text token similarity score. However, if a text token similarity score is less than text token threshold score 802, the updated text token similarity score may be listed 0, or another value, or a reference value indicative of a score that does not satisfy the text token similarity threshold condition. In some embodiments, each updated text token similarity score that is listed as 0, another predefined value, or the reference value, may have data flag metadata 808 generated and assigned to a corresponding text token with which the text token similarity score relates to, a section from a corresponding document that the text token was obtained from, and/or the document that the text token was included within. Data flag metadata 808 may be stored in association with a given document that it relates to, and data flag metadata 808 and the document may be stored in document database 134. As an illustrative example, if a text token similarity score for a text token included within a first sentence of a first section of first document 200 does not satisfy the text token similarity threshold condition, when compared with some or all of second document 300, then data flag metadata 808 may be generated and stored in association with first document 200, second document 300, or other documents, or combinations thereof. In some embodiments, first document 200 and/or second document 300 may be displayed after the text token similarity analysis has been performed and, for each text token, sentence, or section of first document 200. As indicated by data flag metadata 808, if a particular text token's similarity score failed to satisfy the text token similarity threshold condition, data flag subsystem 120 may cause an indicator or other graphical alert to be displayed within first document 200, second document 300, or both, to alert an individual/entity that some or all of one or more sections of second document 300 are not compliant with one or more requirements specified by first document 200. As an example, with reference to FIG. 9, second document 300, when displayed, may include a graphical indicator 900. Graphical indicator 900 may indicate that a particular section (e.g., section 1) of second document 300 fails to comply with a requirement specified in the corresponding section of first document 200. In some embodiments, graphical indicator 900 may be displayed proximate a text token, sentence including the text token, section, which included the text token having the text token similarity score that did not satisfy the text token similarity threshold condition. In some embodiments, graphical indicator 900 may include additional information, resources, recommendations, or a combination thereof, related to the text token that caused graphical indicator 900 to be displayed. For example, graphical indicator 900 may include a link to a portion of first document 200 where the text token was recited. As another example, graphical indicator 900 may include additional statistics regarding the text token (e.g., TF score, commonly found semantically similar text tokens, etc.). In some cases, graphical indicator 900 may include recommendations (e.g., recommended changes to the sentences of second document 300) to increase the likelihood of the text token similarity score satisfying the text token similarity threshold condition.

In some embodiments, edits to response text 304*a* of first section 302*a* of second document 300 may be updated in response to display of graphical indicator 900. As mentioned before, the update may be based on, or automatically implemented based on, the recommended edits. Alternatively or additionally, the updates may include edits to some or all of the words included within response text 304*a*. After updating first section 302*a* and any other sections that are identified as needing to be updated, the updated version of second document 300 may saved to document database 134, and re-analyzed by ensemble network 170.

Returning to FIG. 8, in addition to determining whether one or more text tokens satisfy a text token similarity threshold condition, data flag subsystem 120 may also be configured to determine whether a semantic similarity score satisfies a semantic similarity threshold condition. In some embodiments, the semantic similarity threshold condition is satisfied when a semantic similarity score for a given text token pair greater than or equal to a semantic similarity threshold score 810. For example, semantic similarity threshold score 810 may be a numerical value between 0.0 and 1.0, such as 0.6 or higher, 0.7 or higher, 0.8 or higher, and the like. Semantic similarity threshold score 810 may be predefined or dynamically configurable, and may be stored in threshold database 804. In response to determining whether semantic similarity scores 708 satisfy the semantic similarity threshold condition, data flag subsystem 120 may generate updated semantic similarity scores 812. Similar to updated text token similarity scores 806, updated semantic similarity scores 812 may indicate which semantic similarity scores 708 satisfy or do not satisfy the semantic similarity threshold condition. Accordingly, another data flag may be assigned to a text token, sentence, section, or document that caused a given semantic similarity score to fail the semantic similarity threshold condition. In some embodiments, data flag metadata 808 may further include metadata indicating which semantic similarity scores are not compliant with a particular requirement from first document 200. When displayed, such as in FIG. 9, a graphical indicator may be displayed proximate a text token, sentence, section, or document that caused the semantic similarity score to fail the semantic similarity threshold condition. Additionally, as described above, the graphical indicator may include additional information, such as suggested edits to improve the semantic similarity score, related portions of second document 300 that also include a particular text token, as well as other information that can be used to improve the semantic similarity score.

In some embodiments, a text token similarity score, a semantic similarity score, or other scores, may be computed for each section in a document, multiple sections of a document, an entire document, or other subdivisions or combinations of documents. For example, a section semantic similarity score may be computed based on the semantic similarity score for each text token of the sentences included in a given section. In some embodiments, the semantic similarity scores for the text tokens in a section may be averaged together, or otherwise combined using some weighted combination of values, to obtain a section semantic similarity score. With a section semantic similarity score, a document semantic similarity score may be computed by averaging, or performing a weighted combination of, each section semantic similarity score. A similar process may occur for text token similarity scores, thereby allowing a section text token similarity score to be generated for each section of a document, and/or a document text token similarity score for a given document.

In some embodiments, each section of a document may be weighted differently. Therefore, when computing a document's text token similarity score and/or semantic similarity score, the weights for each section can influence how well the document's final scores will be. Different sections may have different weights, which is not to imply that every section has a different weight, as some sections may have similar weightings as other sections, and therefore a low score for a section that has a small weight will influence the document's overall score much less than a low score would for a section that has a large weight.

The weights for each section may be predefined by computer system 102, an entity operating client device 104, a creator of first document 200, or other sources. The different weights may also be adjustable manually or automatically. In some embodiments, the weights may be included within a particular section of first document 200 (and/or second document 300). For example, a particular section of first document 200 may include weight data including a weight to be attributed to each section. In some embodiments, the weight data may be extracted from first document 200 prior to first document 200 and/or second document 300 being analyzed by ensemble network 170. The weight data may encode a weight to be assigned to each section when computing a document's corresponding score. In some embodiments, multiple sets of weight data may be included in first document 200, where each set of weight data relates to a different score to be computed for second document 300. For example, a first weight may be assigned to a section of second document 300 for computing a text token similarity score for second document 300, whereas a second weight may be assigned to that same section of second document 300 for computing a semantic similarity score for second document 300.

In some embodiments, a determination may be made as to whether a document's text token similarity score and/or semantic similarity score satisfy the text token similarity threshold condition and/or the semantic similarity threshold condition. For instance, based on the weighted combination of the section semantic similarity scores for each section of second document 300, the overall semantic similarity score for second document 300 may be computed and compared to the semantic similarity threshold score. If the overall semantic similarity score for second document 300 is less than the semantic similarity threshold score, second document 300 may be classified as being semantically different from first document 200, and thus edits to the sentences in some or all of the sections of second document 300 may be needed.

In some embodiments, the weights assigned to a given section may be adjusted. For instance, after extracting the weight data from first document 200, one or more of the weights may be adjusted. In some embodiments, each weight may be equal, and adjustments to the weights may be determined based on edits made to portions of second document 300 and the recomputed scores for second document 300.

In some embodiments, one or more of first NLP model 402, second NLP model 502, third NLP model 602, and fourth NLP model 706 may be a deep learning model, such as, and without limitation, a convolutional neural network (CNN), a region-based CNN (R-CNN), a Fast R-CNN, a Masked R-CNN, Single Shot Multibox (SSD), and a You-Only-Look-Once (YOLO) model (lists, such as this one, should not be read to require items in the list be non-overlapping, as members may include a genus or species thereof, for instance, a R-CNN is a species of CNN and a list like this one should not be read to suggest otherwise). As an example, an R-CNN may take each input text, extract entities from the text, and compute features for the text using a CNN. The features of the text may then be classified using a class-specific SVM, identifying text tokens included in the text, named entities text tokens are resolved to be, topic/category information for each text token, or other information. In some embodiments, a transformer model may be employed for one or more of the NLP models (e.g., NLP models 402, 502, 602, 706). For example, the BERT language model may be used for one or more of the NLP models.

Tables 1-3 below includes a breakdown of the results of an analysis between a first document (e.g., first document 200) and a second document (e.g., second document 300).

TABLE 1

| Section | Text |
|---|---|
| 1 | The individual shall support all aspects of data review, production, and management for all of the entity's data production. |
| 2 | Survey data is collected continuously and delivered to the entity's program weekly and the individual shall follow standardized data processing procedures developed by the institute's staff to review data and prepare reports describing data quality and condition, which shall include descriptions of data contents, assessment of completeness/missingness, descriptive statistics including frequencies, crosstabs, means, and/or univariate statistics, for use by the institute's staff in assessing the overall quality of the data and data collection operations and in further developing data production specifications for creation of public use datasets and other data products, analyses, and/or publications. |
| 3 | Data production tasks shall include writing program code to perform data editing, validation, and preparation of files for public release or archiving, and preparing associated user documentation including data dictionaries with code values, ranges, and frequencies. |
| 4 | Data management tasks will include archiving of data sets, data review and production specifications, data quality reports, program code with log and list files, and any other related data production files. |

TABLE 2

| Avg. Sim. Score | Avg. Sim. per file | Mean Avg. Diff. per sent. | Max. Sim. | # of 0 s | Total Ratings | % of 0 Ratings |
|---|---|---|---|---|---|---|
| 3.51 | 3.5 | 0.01 | 0.238612 | 28 | 69 | 40.58 |
| 5.83 | 3.5 | 2.33 | 0.234362 | 11 | 69 | 15.94 |
| 3.85 | 3.5 | 0.35 | 0.210541 | 27 | 69 | 39.13 |
| 4.05 | 3.5 | 0.55 | 0.231706 | 23 | 69 | 33.33 |

TABLE 3

| Cleaned Text | Similarity Vector |
|---|---|
| ['the', individual, 'shall', 'support', 'aspect', 'data', 'review', 'production', 'management', 'entity', 'data', 'production'] | [0.06117351 0.07412223 0.23861195 0.01612731 0.1539647 0.06230465 0.08335499 0.01702541 0. 0.01909172 0.01192481 0. 0.04359817 0.09871031 0.04586589 0.01891206 0. 0.10288294 0.1711564 0. 0.12863472 0.04350004 0. 0.03640318 0.02392546 0. 0.16449429 0.00996503 0.07133335 0.036453 0.02887868 0. 0. 0. 0. 0. 0. 0. 0. 0.00999766 0. 0.05270717 |

TABLE 3-continued

| Cleaned Text | Similarity Vector |
|---|---|
| | 0.0127431 0. 0. 0. 0.05859157 0. 0.00774027 0. 0.0358633 0. 0. 0.06858472 0.04533753 0.07131484 0.0683037 0. 0. 0. 0.01065053 0. 0.01379992 0. 0.01163908 0.03355635 0.07808185 0.07784485 0. ] |
| ['survey', 'data', 'collect', 'continuously', 'deliver', 'entity', 'program', 'weekly', 'individual', 'shall', 'follow', 'standardize', 'data', 'processing', 'procedure', 'develop', 'entity', 'staff', 'review', 'data', 'prepare', 'report', 'describe', 'data', 'quality', 'condition', 'shall', 'include', 'description', 'data', 'content', 'assessment', 'descriptive', 'statistic', 'include', 'frequency', 'crosstabs', 'mean', 'univariate', 'statistic', 'use', 'institute', 'staff', 'assess', 'overall', 'quality', 'data', 'data', 'collection', 'operation', 'develop', 'data', 'production', 'specification', 'creation', 'public', 'use', 'datasets', 'data', 'product', 'analysis', 'publication'] | [0.09260385 0.06907503 0.23436159 0.09734716 0.18833494 0.03944968 0.01530094 0.0540147 0. 0.09507635 0.09906995 0.08113226 0.03833012 0.10256618 0.0895955 0.10687894 0.0537243 0.12459762 0.05796215 0. 0.077874 0. 0.04333952 0.1337712 0.096187370. 0.04785389 0.11548285 0.0910805 0.10938204 0.01060215 0.03996307 0. 0.0506104 0.104571830.01332101 0. 0.05583965 0.06866446 0.03335116 0. 0.05000385 0.07174172 0.0372216 0.01557754 0.04502706 0.05327829 0.0093028 0.02582074 0.01316599 0.05787762 0. 0. 0.04990432 0.12250269 0.07887274 0.0570496 0.06950857 0.05737708 0. 0.01759545 0.03403943 0.0460351 0.08408525 0.06276291 0.11955917 0.07957627 0.03574849 0. ] |
| ['data', 'production', 'task', 'shall', 'include', 'write', 'program', 'code', 'perform', 'data', 'edit', 'validation', 'preparation', 'file', 'public', 'release', 'archive', 'prepare', 'associate', 'user', 'documentation', 'include', 'data', 'dictionary', 'code', 'value', 'range', 'frequency'] | [0. 0.02723926 0.16532254 0.01348386 0.04829168 0.09330138 0.21054092 0.00948983 0. 0.16029766 0.08321675 0. 0. 0.10294528 0.02556529 0.06416032 0. 0.20033473 0.09471755 0. 0.10591554 0. 0. 0.11358565 0.03658831 0.05573357 0.08493492 0.07466058 0.02003028 0.03047793 0. 0.01508514 0. 0.02952633 0.04029366 0. 0. 0.01978152 0.03063771 0.03391767 0. 0.04936777 0.17626126 0. 0. 0. 0.01412402 0.02625934 0. 0. 0. 0.07996782 0. 0.0181054 0. 0.07668661 0. 0. 0.00890479 0. 0.04681707 0.03751837 0.0097313 0.0967612 0.01738194 0.00799893 0. ] |
| ['data', 'management', 'task', 'include', 'archive', 'data', 'set', 'data', 'review', 'production', 'specification', 'data', 'quality', 'report', 'program', 'code', 'log', 'list', 'file', 'relate', 'data', 'production', 'file'] | [0. 0.04675775 0.23170584 0.02314582 0.0867811 0.13186201 0.22881289 0.00977391 0. 0.06051715 0.01711441 0.0819568 0.02502873 0.11494802 0.02633058 0.0520402 0. 0.11509972 0.11382217 0. 0.10342896 0. 0. 0.06822055 0.10864081 0.11480386 0.07990722 0.01430176 0.02804817 0.05231712 0. 0.01553671 0. 0.07913958 0.04149983 0.07338995 0. 0.02037367 0.01577742 0.0275105 0.13159636 0. 0.01828882 0. 0. 0.0336361 0.01454681 0.02129885 0. 0.02058832 0. 0. 0.01644623 0. 0.03107896 0. 0. 0. 0. 0.015285580. 0.03797314 0.01932074 0.01670434 0.08017077 0.11480248 0.013730620. ] |

In Table 1, each sentence from the first document (e.g., document 200) is extracted and order by section. For simplicity, each section includes one sentence, however other sections may include one or more sentences, characteristics, graphs, or other information. In some embodiments, the raw text data representing each sentence is extracted by a first NLP model, such as a model configured to identify a location of text in a given document, and extract the raw text data representing the text. This may include parsing the raw text into candidate text tokens each representing a string of characters separated from other strings of characters by one or more delimiters (e.g., commas, semicolons, spaces, etc.). In some embodiments, a position of each candidate text token may be encoded into the text token to all for attention mechanisms to determine an importance of a given text token to other text tokens from the raw text.

In Table 2, an average similarity score for each sentence of the second document may be computed. The average similarity score indicates how similar each sentence from a given section of the first document is to a corresponding sentence of a corresponding section of the second document. The similarity between the two sentences may be determined based on how similar the text tokens of each sentence is to the text tokens of the other sentence. The average similarity score per file. The average similarity score per file may be computed by averaging the similarity score of each section. (It should be noted that the file may include additional sections not shown, and the average similarity score per file may be computed using additional sections' similarity scores.)

The mean average difference per sentence (and section) may be computed by computing a difference between the average similarity of each sentence/section to the average similarity score of the file. In some embodiments, differences that are positive indicate that the sentence or sentences of the section of the second document satisfy the requirements set forth in the corresponding section of the first document as the words included in the section of the second document are similar to the words included in the corresponding section of the first document. Differences that are negative mean that sentences of the section of the second document may need to be edited to improve their similarity to the requirements set forth in the corresponding section of the first document. The maximum similarity value may indicate which text token of a given sentence has a greatest similarity to a text token of the corresponding sentence of the first document. For example, the text token "shall" from the sentence of the first section may have the greatest similarity score, 0.238612. The number of zeros indicates a total number of zeros included in the similarity vector describing the sentence.

The total ratings in the array represents a total number of similarity ratings identified by the NLP models. The total number of similarity ratings indicates how many significant words a given sentence includes after stop words are removed as well as other non-significant characters. The percentage of zero ratings indicates the percentage of zeros included in the similarity vector. The cleaned text represents a string of the significant words included in the sentence after stop words have been removed and other pre-processing steps are performed. The similarity vector is a representation of the similarity ratings for each of the words in the first document. In some embodiments, Tables 1-3 may be provided in a results document for review by a user. Furthermore, in some embodiments, a document may be output with data flags indicating when a particular section has a similarity score that does not satisfy a threshold condition. As an example, a graphical indicator (e.g., graphical indicator 900) may indicate that a particular section (e.g., section 1) of first document 200 fails to comply with a requirement specified in the corresponding section (e.g., that 0.01 is less than a threshold score of 0.1).

The machine learning techniques that can be used in the systems described herein may include, but are not limited to (which is not to suggest that any other list is limiting), any of the following: Ordinary Least Squares Regression (OLSR), Linear Regression, Logistic Regression, Stepwise Regression, Multivariate Adaptive Regression Splines (MARS), Locally Estimated Scatterplot Smoothing (LOESS), Instance-based Algorithms, k-Nearest Neighbor (KNN), Learning Vector Quantization (LVQ), Self-Organizing Map (SOM), Locally Weighted Learning (LWL), Regularization Algorithms, Ridge Regression, Least Absolute Shrinkage and Selection Operator (LASSO), Elastic Net, Least-Angle Regression (LARS), Decision Tree Algorithms, Classification and Regression Tree (CART), Iterative Dichotomizer 3 (ID3), C4.5 and C5.0 (different versions of a powerful approach), Chi-squared Automatic Interaction Detection (CHAID), Decision Stump, M5, Conditional Decision Trees, Naive Bayes, Gaussian Naive Bayes, Causality Networks (CN), Multinomial Naive Bayes, Averaged One-Dependence Estimators (AODE), Bayesian Belief Network (BBN), Bayesian Network (BN), k-Means, k-Medians, K-cluster, Expectation Maximization (EM), Hierarchical Clustering, Association Rule Learning Algorithms, A-priori algorithm, Eclat algorithm, Artificial Neural Network Algorithms, Perceptron, Back-Propagation, Hopfield Network, Radial Basis Function Network (RBFN), Deep Learning Algorithms, Deep Boltzmann Machine (DBM), Deep Belief Networks (DBN), Convolutional Neural Network (CNN), Deep Metric Learning, Stacked Auto-Encoders, Dimensionality Reduction Algorithms, Principal Component Analysis (PCA), Principal Component Regression (PCR), Partial Least Squares Regression (PLSR), Collaborative Filtering (CF), Latent Affinity Matching (LAM), Cerebri Value Computation (CVC), Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA), Ensemble Algorithms, Boosting, Bootstrapped Aggregation (Bagging), AdaBoost, Stacked Generalization (blending), Gradient Boosting Machines (GBM), Gradient Boosted Regression Trees (GBRT), Random Forest, Computational intelligence (evolutionary algorithms, etc.), Computer Vision (CV), Natural Language Processing (NLP), Recommender Systems, Reinforcement Learning, Graphical Models, or separable convolutions (e.g., depth-separable convolutions, spatial separable convolutions).

Example Flowcharts

FIGS. 10A-10D illustrate an example process 1000 for determining whether one or more sections of a first document comply with at least one requirement of a corresponding section from a second document, in accordance with various embodiments. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

Process 1000 may begin at operation 1002. In operation 1002, a first document including a plurality of sections may be obtained. In the first document, each section may include at least one sentence including a predefined keyword. For example, first document 200 may include sections 1-N, and each section may include at least one sentence which includes a predefined keyword (e.g., the word "shall"). In some embodiments, sections in the first document may include additional sentences that do not include the predefined keyword. For example, sentence 204c of first section 202a of first document 200 does not include an instance of the predefined keyword (e.g., "shall"). In some embodiments, operation 1002 may be performed by a subsystem that is the same or similar to first NLP subsystem 112.

In operation 1004, a second document including the plurality of sections may be obtained. In the second document, each section may include one or more sentences. In some cases, the sentences in the sections do not include the predefined keyword, however in some embodiments, the predefined keyword may be present. In some embodiments, second document 300 includes a same number of sections as first document 200. For example, first document 200 includes sections 202a-202c, corresponding to sections 1-N, and second document 300 includes sections 302a-302c, which also correspond to sections 1-N. The sentences included in the N-th section of second document 300 may relate to one or more of the sentences in the N-th section of first document 200. For instance, the sentences in the N-th section of second document 300 may form a response to a requirement specified by a sentence from the N-th section of first document 200. In some embodiments, operation 1004 may be performed by a subsystem that is the same or similar to first NLP subsystem 112.

In operation 1006, each instance of a predefined keyword may be identified in each section of the first document using a first NLP model. In some embodiments, each sentence in each section of the first document (e.g., first document 200) may be parsed into text tokens, and a keyword spotting model may be used to determine whether a text token is the predefined keyword. In some embodiments, the keyword spotting model may be a deep neural network, such as a CNN, and may perform comparisons between characters included in a window that moves about the text, and characters forming the predefined keyword. If the keyword spotting model determines that a particular set of characters represents the predefined keyword, then the keyword spotting model may generate an instruction to cause text data to be extracted from first document 200. In some embodiments, operation 1006 may be performed by a subsystem that is the same or similar to first NLP subsystem 112.

In operation 1008, first text data representing first text tokens of the at least one sentence determined to include the predefined keyword in each section of the first document may be extracted. In some embodiments, the first text data may represent sets of text tokens, where each set of text tokens is a word included in a separate sentence from a given section that include the predefined keyword. Alternatively or additionally, multiple instances of text data may be extracted from a section of first document 200, where each instance of text data representing text tokens from a single sentence that includes the predefined keyword. In some embodiments, operation 1008 may be performed by a subsystem that is the same or similar to first NLP subsystem 112.

In operation 1010, second text data representing second text tokens of the sentences included in each section of the second document may be extracted. For example, an instance of text data representing text tokens from the sentences included in a first section 302a of second document 300 may be extracted, an instance of text data representing text tokens from the sentences included in a second section 302b of second document 300 may be extracted, and so on. In some embodiments, operation 1010 may be performed by a subsystem that is the same or similar to first NLP subsystem 112.

In operation 1012, a feature vector representing each of the first tokens may be generated using a second NLP model. In some embodiments, the feature vector may be generated based on the extracted first text data. In some embodiments, generation of the feature vector for each of the first text tokens may produce a first set of textual feature vectors, where each feature vector from the first set of textual feature vectors represents a text token from the first set of text tokens. In some embodiments, operation 1012 may be performed by a subsystem that is the same or similar to second NLP subsystem 114.

In operation 1014, a feature vector representing each of the second text tokens may be generated using the second NLP model. In some embodiments, the feature vector may be generated based on the extracted second text data. In some embodiments, generation of the feature vector for each of the second text tokens may produce a second set of textual feature vectors, where each feature vector from the second set of textual feature vectors represents a text token from the second text tokens. In some embodiments, operation 1014 may be performed by a subsystem that is the same or similar to second NLP subsystem 114.

In operation 1016, a set of text tokens from the first and second text tokens that occur most frequently in the first document and the second document may be determined. In some embodiments, a TF-IDF analysis of the first and second text tokens may be performed to determine the most significant text tokens from each document. The TF-IDF analysis may identify which terms are most significant. For example, a word that appears only once in an entire document is less significant than a word that appears most frequently in the entire document. In some embodiments, operation 1016 may be performed by a subsystem that is the same or similar to third NLP subsystem 116.

In operation 1018, a set of feature vectors from the first and second sets of feature vectors may be selected. Each selected feature vector may correspond to a text token from the set of text tokens. As an example, if text tokens Token_0, Token_1, and Token_2 are determined to be the most significant terms in documents 200 and 300, then a feature vector corresponding to each of Token_0, Token_1, and Token_2 may be selected and retrieved from feature vector database 138. In some embodiments, operation 1018 may be performed by a subsystem that is the same or similar to third NLP subsystem 116.

In operation 1020, a first distance in a first feature space may be computed between each feature vector from the selected set of feature vectors. Using the third NLP model (e.g., third NLP model 602), a distance may be computed between pairs of feature vectors from the selected set of feature vectors. In some embodiments, the distance may be a Euclidean distance, an L2 distance, a Minkowski distance, or other feature space distances. In some embodiments, operation 1020 may be performed by a subsystem that is the same or similar to third NLP subsystem 116.

In operation 1022, a text token similarity score between each text token from the selected set of text tokens may be determined based on the first distance. For example, a text token similarity score may be determined based on an angle $\theta 1$, as seen in FIG. 6B. In some embodiments, angles between feature vectors that are smaller (e.g., $\theta<20$ degrees, $\theta<10$ degrees, etc.) indicate that the two text tokens are similar, whereas angles between feature vectors that are larger (e.g., $\theta>70$ degrees, $\theta<80$ degrees, etc.) indicate that the two text tokens are not similar. In some embodiments, operation 1022 may be performed by a subsystem that is the same or similar to third NLP subsystem 116.

In operation 1024, a section text token similarity score may be generated for each section based on the text token similarity scores for each text token of the selected set of text tokens in that section. In some embodiments, the section text token similarity score may be computed by combining the text token similarity scores of each text token in a particular section (or text tokens from text data extracted from a corresponding document). As an example, each text token similarity score in a first section of second document 300 may be averaged to obtain a section text token similarity score for the first section. In some embodiments, operation 1024 may be performed by a subsystem that is the same or similar to data flag subsystem 120.

In operation 1026, a determination may be made as to whether the section text token similarity score satisfies a first threshold condition. The determination may be made for each section's text token similarity score. In some embodiments, the first threshold condition refers to a text token similarity threshold condition. The first threshold condition may be satisfied if a given text token similarity score (e.g., a section text token similarity score) is greater than or equal to a text token similarity threshold score. In some embodiments, operation 1026 may be performed by a subsystem that is the same or similar to data flag subsystem 120.

Figure 7B:
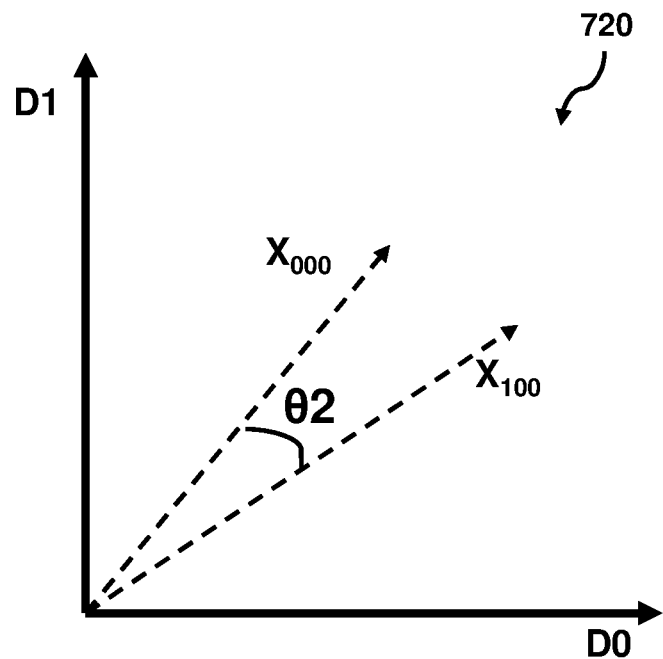
FIG. 7B illustrates an example graph depicting a distance between feature vectors representing text tokens and determining a semantic similarity of the text tokens based on the distance, in accordance with various embodiments.

In operation 1028, a second distance in a second feature space between each feature vector from the first and second sets of textual feature vectors may be computed using a fourth NLP model. In some embodiments, the second distance represents how semantically similar the a pair of feature vectors are to one another. For example, a semantic similarity score may be determined based on an angle θ2, as seen in FIG. 7B. In some embodiments, angles between feature vectors that are smaller (e.g., θ<20 degrees, θ<10 degrees, etc.) indicate that the two text tokens are semantically similar, whereas angles between feature vectors that are larger (e.g., θ>70 degrees, θ<80 degrees, etc.) indicate that the two text tokens are not semantically similar. In some embodiments, operation 1028 may be performed by a subsystem that is the same or similar to fourth NLP subsystem 118.

In operation 1030, for each section, a semantic similarity score may be determined between each text token from the first and second sets of text tokens based on the corresponding second distance. As mentioned above, angles between feature vectors that are smaller indicate that two text tokens are semantically similar, whereas angles between feature vectors that are larger indicate that the two text tokens are not semantically similar. Therefore, the distance measure between the two feature vectors may be used to determine the semantic similarity score. As an example, if the angle θ2 of FIG. 7B is zero (e.g., θ2=0), then the semantic similarity score between feature vectors $X_{000}$ and $X_{100}$ would be 1.0 or 100%, indicating the two text tokens are semantically equivalent. In some embodiments, operation 1030 may be performed by a subsystem that is the same or similar to fourth NLP subsystem 118.

In operation 1032, a section semantic similarity score may be generated, for each section, based on the semantic similarity score for each text token in the section of the second document. In some embodiments, the section semantic similarity score may be computed by combining the semantic similarity scores of each text token in a particular section (or text tokens from text data extracted from a corresponding document). As an example, each semantic similarity score in a first section of second document 300 may be averaged to obtain a section semantic similarity score for the first section. In some embodiments, operation 1032 may be performed by a subsystem that is the same or similar to fourth NLP subsystem 118.

In operation 1034, a determination may be made as to whether the section semantic similarity score satisfies a second threshold condition. The determination may be made for each section's semantic similarity score. In some embodiments, the second threshold condition refers to a semantic similarity threshold condition. The second threshold condition may be satisfied if a given text token's semantic similarity score is greater than or equal to a semantic similarity threshold score. In some embodiments, operation 1034 may be performed by a subsystem that is the same or similar to data flag subsystem 120.

In operation 1036, a decision is made as to whether the first threshold condition was satisfied from each section text token similarity score. If so, process 1000 may proceed to operation 1042. However, if at operation 1036 it is determined that a section text token similarity score does not satisfy the first threshold condition, process 1000 may proceed to operation 1038. In operation 1038, a decision is made as to whether the second threshold condition was satisfied from each section semantic similarity score. If so, process 1000 may proceed to operation 1042. However, if at operation 1038 it is determined that a section semantic similarity score does not satisfy the second threshold condition, process 1000 may proceed to operation 1040. In some embodiments, operations 1036 and 1036 may be performed by a subsystem that is the same or similar to data flag subsystem 120.

In operation 1040, a data flag may be generated and stored with each section of the second document that fails to satisfy the first threshold condition, the second threshold condition, or both. In some embodiments, which sections (or even text tokens) fail to satisfy one or more threshold conditions may be stored as metadata (e.g., data flag metadata 808) in association with a corresponding document. This may allow for a visualization of the document to be rendered where each section of second document 300 that fails to comply with one or more requirements specified in that section of first document 200 is presented. In some embodiments, operations 1040 may be performed by a subsystem that is the same or similar to data flag subsystem 120.

In operation 1042, an indication may be provided for each section that satisfies the first threshold condition, the second threshold condition, or both. In some embodiments, which sections (or even text tokens) satisfy one or more threshold conditions may be stored as metadata (e.g., data flag metadata 808) in association with a corresponding document. This may allow for a visualization of the document to be rendered where each section of second document 300 that does comply with one or more requirements specified in that section of first document 200 is presented. In some embodiments, operations 1042 may be performed by a subsystem that is the same or similar to data flag subsystem 120.

Figure 11:
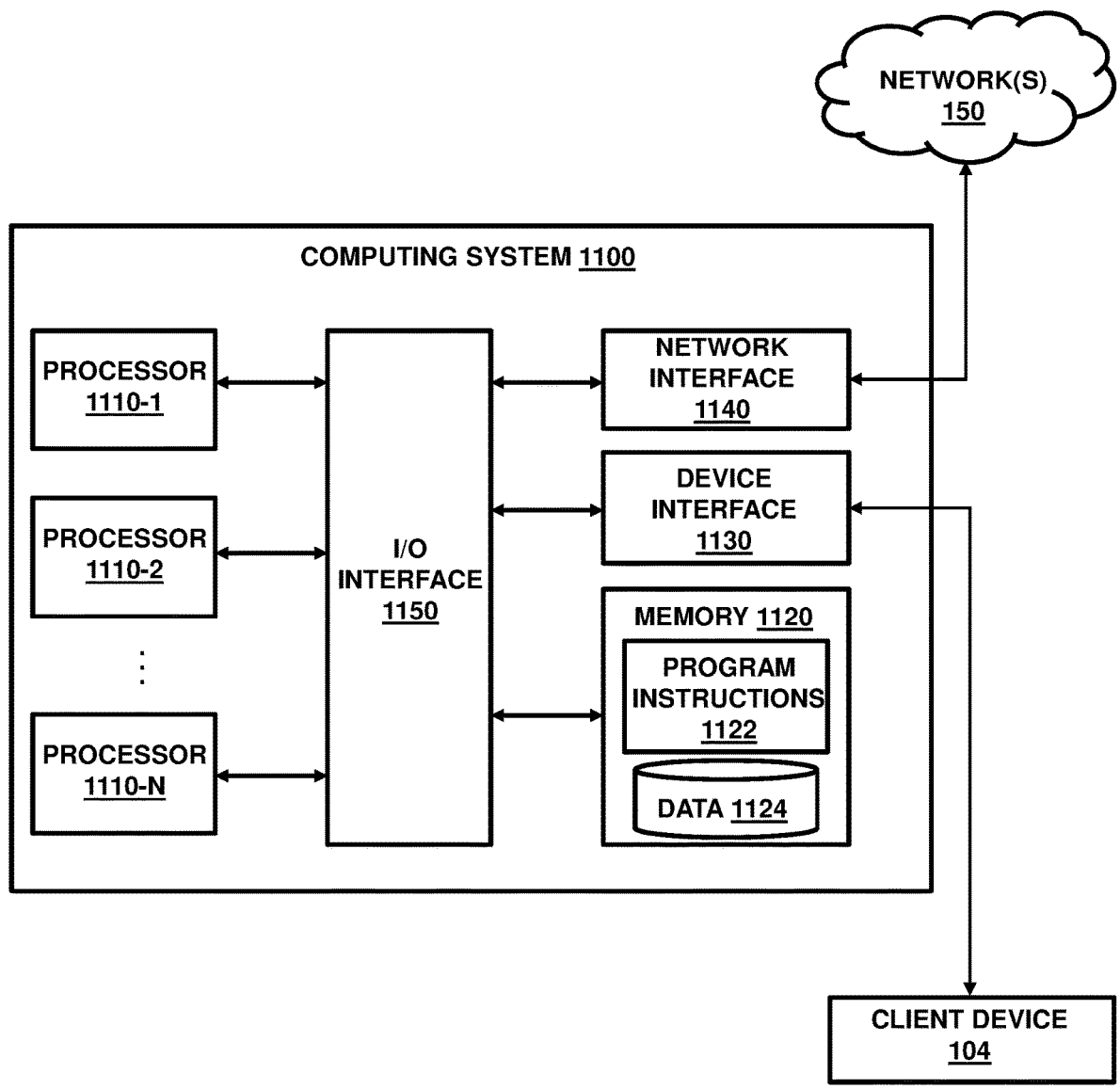
FIG. 11 illustrates an example of a computing system by which one or more of the present techniques may be implemented, in accordance with various embodiments.

FIG. 11 is a diagram that illustrates an exemplary computing system 1100 in accordance with embodiments of the present technique. Various portions of systems and methods described herein, may include or be executed on one or more computer systems similar to computing system 1100. Further, processes and modules described herein may be executed by one or more processing systems similar to that of computing system 1100. In some embodiments, computer system 102, mobile computing device 104, or other components of system 100 may include some or all of the components and features of computing system 1100.

Computing system 1100 may include one or more processors (e.g., processors 1110-1-1110-N) coupled to system memory 1120, an input/output I/O device interface 1130, and a network interface 1140 via an input/output (I/O) interface 1150. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1100. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1120). Computing system 1100 may be a uni-processor system including one processor (e.g., processor 1110-1), or a multi-processor system including any number of suitable processors (e.g., 1110-1-1110-N). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1100 may include a plurality of computing devices (e.g., distributed computer systems) to implement various processing functions.

I/O device interface 1130 may provide an interface for connection of one or more I/O devices. such as client device 104, to computer system 1100. I/O devices may include devices that receive input (e.g., from a user) or output information (e.g., to a user). I/O devices may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices may be connected to computer system 1100 through a wired or wireless connection. I/O devices may be connected to computer system 1100 from a remote location. I/O devices located on remote computer system, for example, may be connected to computer system 1100 via a network and network interface 1140.

Network interface 1140 may include a network adapter that provides for connection of computer system 1100 to a network. Network interface may 1040 may facilitate data exchange between computer system 1100 and other devices connected to the network. Network interface 1140 may support wired or wireless communication. The network may include an electronic communication network, such as the Internet, a local area network (LAN), a wide area network (WAN), a cellular communications network, or the like.

System memory 1120 may be configured to store program instructions 1122 or data 1124. Program instructions 1122 may be executable by a processor (e.g., one or more of processors 1110-1-1110-N) to implement one or more embodiments of the present techniques. Program instructions 1122 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1120 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1120 may include a non-transitory computer readable storage medium that may have program instructions stored thereon that are executable by a computer processor (e.g., one or more of processors 1110-1-1110-N) to cause the subject matter and the functional operations described herein. A memory (e.g., system memory 1120) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1150 may be configured to coordinate I/O traffic between processors 1110-1-1110-N, system memory 1120, network interface 1140, I/O devices (e.g., client device 104), and/or other peripheral devices. I/O interface 1150 may perform protocol, timing, or other data transformations to convert data signals from one component (e.g., system memory 1120) into a format suitable for use by another component (e.g., processors 1110-1-1110-N). I/O interface 1150 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1100 or multiple computer systems 1100 configured to host different portions or instances of embodiments. Multiple computer systems 1100 may provide for parallel or sequential processing/execution of one or more portions of the techniques described herein.

Those skilled in the art will appreciate that computer system 1100 is merely illustrative and is not intended to limit the scope of the techniques described herein. Computer system 1100 may include any combination of devices or software that may perform or otherwise provide for the performance of the techniques described herein. For example, computer system 1100 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1100 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to cost constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

A1. A method, comprising: obtaining a first document and a second document each comprising a plurality of sections, wherein each section of the first document comprises at least one sentence including a predefined keyword, and wherein each section of the second document comprises one or more sentences; identifying, using a first natural language processing (NLP) model, each instance of the predefined keyword in each section of the first document; for each section of the plurality of sections of the first document: extracting, using the first NLP model, first text data representing first text tokens of the at least one sentence including the predefined keyword; generating, using a second NLP model, based on the first text data, a feature vector representing each of the first text tokens of the at least one sentence including the predefined keyword to obtain a first set of textual feature vectors; for each section of the plurality of sections of the second document: extracting, using the first NLP model, second text data representing second text tokens of each of the one or more sentences of a given section of the second document; generating, using the second NLP model, a feature vector representing each of the second text tokens of the given section of the second document to obtain a second set of textual feature vectors; determining, based on a term frequency-inverse document frequency (TF-IDF) analysis of each section of the first document and the second document, a set of text tokens from the first text tokens and the second text tokens that occur most frequently in the first document and the second document; selecting a set of feature vectors from the first set of textual feature vectors and the second set of textual feature vectors, wherein each feature vector selected corresponds to a text token from the set of text tokens; determining a text token similarity score between each text token from the set of text tokens, wherein determining the text token similarity score comprises computing, using a third NLP model, a first distance in a first feature space between each feature vector from the selected set of feature vectors; generating, for each section of the plurality of sections, a section text token score based on the text token similarity score for each text token of the set of text tokens included in a given section; determining, for each section of the plurality of sections, whether the section text token score satisfies a first threshold condition, the first threshold condition being satisfied for a section text token score that is greater than or equal to a threshold text token score; and generating and storing a data flag with each section of the plurality of sections of the second document having a respective threshold text token score failing to satisfy the first threshold condition.

A2. The method of embodiment A1, further comprising: determining, for each section of the plurality of sections, a semantic similarity score between each text token from the first text tokens and the second text tokens, wherein determining the semantic similarity score comprises computing, using a fourth NLP model, a second distance in a second feature space between each feature vector from the first set of textual feature vectors and the second set of textual feature vectors, wherein the semantic similarity score indicates how semantically similar two text tokens are to one another; generating, for each section of the plurality of sections, a section semantic score based on the semantic similarity score for each text token included in a given section of the second document; and determining, for each section of the plurality of sections, whether the section semantic score satisfies a second threshold condition, the second threshold condition being satisfied for a section semantic score that is greater than or equal to a second threshold semantic similarity score, wherein the data flag is further generated and stored with each section of the plurality of sections having a corresponding section semantic score that satisfies the second threshold condition.

A3. The method of embodiment A2, wherein: the first NLP model comprises a keyword spotting model trained to detect instances of the predefined keyword within text; the second NLP model comprises a convolutional neural network (CNN) trained to perform named entity recognition and generate feature vectors; the third NLP model comprises a deep neural network trained to compute the first distance in the first feature space between two feature vectors to determine the text token similarity score; and the fourth NLP model comprises a deep neural network trained to compute the second distance in the second feature space between two feature vectors to determine the semantic similarity score.

A4. The method of any one of embodiments A2-A3, wherein determining the semantic similarity score for each section of the plurality of sections comprises: (i) selecting a feature vector from the first set of textual feature vectors and a feature vector from the second set of textual feature vectors; (ii) computing the second distance in the second feature space between the feature vector from the first set of textual feature vectors and the feature vector from the second set of textual feature vectors; (iii) selecting an additional feature vector from the second set of textual feature vectors; (iv) computing the second distance in the second feature space between the feature vector from the first set of textual feature vectors and the additional feature vector from the second set of textual feature vectors; (v) repeating steps (iii) and (iv) for each feature vector of the second set of textual feature vectors; and (vi) repeating steps (i)-(v) for each additional feature vector from the first set of textual feature vectors, wherein semantic similarity score for a given text token of the first text tokens and a given text token from the second text tokens comprises the second distance between a corresponding feature vector from the first set of textual feature vectors and a corresponding feature vector from the second set of textual feature vectors.

A5. The method of embodiment A4, wherein: the second distance comprises at least one of an L2 distance, a Euclidean distance, a cosine distance, a Minkowski distance, a Hamming distance, or a Mahalanobis distance; and the second feature space comprises a multi-dimensional feature space.

A6. The method of any one of embodiments A2-A5, wherein generating the section semantic score for a given section comprises averaging the semantic similarity score for each text token included in the given section to obtain an average semantic similarity score for the given section, determining whether the section semantic score for the given section satisfies the second threshold condition comprises: determining whether the average semantic similarity score for the given section is greater than or equal to the second threshold semantic similarity score.

A7. The method of any one of embodiments A1-A6, further comprising: tagging, using the second NLP model, each of the first text tokens and each of the second text tokens with a part-of-speech (POS) tag indicating a part of speech that a given text token represents; detecting, using the second NLP model, one or more named entities within the at least one sentence of a given section of the first document and within the one or more sentences of the given section of the second document; and assigning, using the second NLP model, a named entity recognition (NER) tag to each of the one or more named entities detected within the at least one sentence and within the one or more sentences, wherein: each feature vector of the first set of textual feature vectors is generated based on the NER tag assigned to each of the one or more named entities detected within the at least one sentence, and each feature vector of the second set of textual feature vectors is generated based on the NER tag assigned to each of the one or more named entities detected within the given section.

A8. The method of any one of embodiments A1-A7, further comprising: extracting, from the first document, an initial set of weights indicating a weight attributed to each section of the plurality of sections; and applying each weight from the initial set of weights to the section text token score of a corresponding section to obtain a weighted section text token score for each section, wherein determining whether the section text token score for each section of the plurality of sections satisfies the first threshold condition comprises: determining whether the weighted section text token score for each section satisfies the first threshold condition.

A9. The method of any one of embodiments A1-A8, further comprising: responsive to extracting the first text data, populating a first data structure with the first text tokens, wherein the first data structure stores each of the first text tokens in association with a section identifier associated with a corresponding section that a text token from the first text tokens was extracted from; and responsive to extracting the second text data, populating a second data structure with the second text tokens, wherein the second data structure stores each of the second text tokens in association with the section identifier associated with the corresponding section that a text token from the second text tokens was extracted from, wherein the first set of textual feature vectors are generated based on the first data structure and the second set of textual feature vectors are generated based on the second data structure.

A10. The method of any one of embodiments A1-A9, further comprising: generating a user interface to be rendered by a client device, wherein the user interface includes the second document having a visual indicator displayed with each section of the plurality of sections that is determined to have a respective semantic similarity score that fails to satisfy the first threshold condition.

A11. The method of any one of embodiments A1-A8, further comprising: performing pre-processing to the first text data and the second text data, wherein: the pre-processing includes stop word removal and word stemming, and the first set of textual feature vectors and the second set of textual feature vectors being obtained based on the pre-processed first text data and the pre-processed second text data, respectively.

A12. The method of any one of embodiments A1-A11, wherein: each section of the plurality of sections of the first document includes a plurality of sentences, the plurality of sentences including the at least one sentence including the predefined keyword; the first text data comprises n-grams, alphanumeric character strings, or n-grams and alphanumeric character strings of the at least one sentence including the predefined keyword; and n-grams, alphanumeric character strings, or n-grams and alphanumeric character strings of each sentence of the plurality of sentences that does not include the predefined keyword is not extracted.

A13. A system, comprising: memory storing computer program instructions; and one or more processors that execute the computer program instructions to effectuate operations comprising any of embodiments A1-A12.

A14. A non-transitory computer-readable medium storing computer program instructions that, when executed by one or more processors, effectuate operations comprising any of embodiments A1-A12.

What is claimed is:

1. A system, comprising:
memory storing computer program instructions; and
one or more processors that execute the computer program instructions to effectuate operations comprising:
obtaining a first document and a second document each comprising a plurality of sections, wherein each section of the first document comprises at least one sentence including a predefined keyword, and wherein each section of the second document comprises one or more sentences;
identifying, using a first natural language processing (NLP) model, each instance of the predefined keyword in each section of the first document;
for each section of the plurality of sections of the first document:
extracting, using the first NLP model, first text data representing first text tokens of the at least one sentence including the predefined keyword;
generating, using a second NLP model, based on the first text data, a feature vector representing each of the first text tokens of the at least one sentence including the predefined keyword to obtain a first set of textual feature vectors;
for each section of the plurality of sections of the second document:
extracting, using the first NLP model, second text data representing second text tokens of each of the one or more sentences of a given section of the second document;
generating, using the second NLP model, a feature vector representing each of the second text tokens of the given section of the second document to obtain a second set of textual feature vectors;
determining, based on a term frequency-inverse document frequency (TF-IDF) analysis of each section of the first document and the second document, a set of text tokens from the first text tokens and the second text tokens that occur most frequently in the first document and the second document;
selecting a set of feature vectors from the first set of textual feature vectors and the second set of textual feature vectors, wherein each feature vector selected corresponds to a text token from the set of text tokens;
determining a text token similarity score between each text token from the set of text tokens, wherein determining the text token similarity score comprises computing, using a third NLP model, a first distance in a first feature space between each feature vector from the selected set of feature vectors;
generating, for each section of the plurality of sections, a section text token score based on the text token similarity score for each text token of the set of text tokens included in a given section;
determining, for each section of the plurality of sections, whether the section text token score satisfies a first threshold condition, the first threshold condition being satisfied for a section text token score that is greater than or equal to a threshold text token score; and
generating and storing a data flag with each section of the plurality of sections of the second document having a respective threshold text token score failing to satisfy the first threshold condition.

2. The system of claim 1, wherein the operations further comprise:
determining, for each section of the plurality of sections, a semantic similarity score between each text token from the first text tokens and the second text tokens, wherein determining the semantic similarity score comprises computing, using a fourth NLP model, a second distance in a second feature space between each feature vector from the first set of textual feature vectors and the second set of textual feature vectors, wherein the semantic similarity score indicates how semantically similar two text tokens are to one another;
generating, for each section of the plurality of sections, a section semantic score based on the semantic similarity score for each text token included in a given section of the second document; and
determining, for each section of the plurality of sections, whether the section semantic score satisfies a second threshold condition, the second threshold condition being satisfied for a section semantic score that is greater than or equal to a second threshold semantic similarity score, wherein the data flag is further generated and stored with each section of the plurality of sections having a corresponding section semantic score that satisfies the second threshold condition.

3. The system of claim 2, wherein:
the first NLP model comprises a keyword spotting model trained to detect instances of the predefined keyword within text;
the second NLP model comprises a convolutional neural network (CNN) trained to perform named entity recognition and generate feature vectors;
the third NLP model comprises a deep neural network trained to compute the first distance in the first feature space between two feature vectors to determine the text token similarity score; and
the fourth NLP model comprises a deep neural network trained to compute the second distance in the second feature space between two feature vectors to determine the semantic similarity score.

4. The system of claim 2, wherein determining the semantic similarity score for each section of the plurality of sections comprises:
(i) selecting a feature vector from the first set of textual feature vectors and a feature vector from the second set of textual feature vectors;
(ii) computing the second distance in the second feature space between the feature vector from the first set of textual feature vectors and the feature vector from the second set of textual feature vectors;

(iii) selecting an additional feature vector from the second set of textual feature vectors;
(iv) computing the second distance in the second feature space between the feature vector from the first set of textual feature vectors and the additional feature vector from the second set of textual feature vectors;
(v) repeating steps (iii) and (iv) for each feature vector of the second set of textual feature vectors; and
(vi) repeating steps (i)-(v) for each additional feature vector from the first set of textual feature vectors, wherein semantic similarity score for a given text token of the first text tokens and a given text token from the second text tokens comprises the second distance between a corresponding feature vector from the first set of textual feature vectors and a corresponding feature vector from the second set of textual feature vectors.

5. The system of claim 4, wherein:
the second distance comprises at least one of an L2 distance, a Euclidean distance, a cosine distance, a Minkowski distance, a Hamming distance, or a Mahalanobis distance; and
the second feature space comprises a multi-dimensional feature space.

6. The system of claim 2, wherein generating the section semantic score for a given section comprises averaging the semantic similarity score for each text token included in the given section to obtain an average semantic similarity score for the given section, determining whether the section semantic score for the given section satisfies the second threshold condition comprises:
determining whether the average semantic similarity score for the given section is greater than or equal to the second threshold semantic similarity score.

7. The system of claim 1, wherein the operations further comprise:
tagging, using the second NLP model, each of the first text tokens and each of the second text tokens with a part-of-speech (POS) tag indicating a part of speech that a given text token represents;
detecting, using the second NLP model, one or more named entities within the at least one sentence of a given section of the first document and within the one or more sentences of the given section of the second document; and
assigning, using the second NLP model, a named entity recognition (NER) tag to each of the one or more named entities detected within the at least one sentence and within the one or more sentences, wherein:
each feature vector of the first set of textual feature vectors is generated based on the NER tag assigned to each of the one or more named entities detected within the at least one sentence, and
each feature vector of the second set of textual feature vectors is generated based on the NER tag assigned to each of the one or more named entities detected within the given section.

8. The system of claim 1, wherein the operations further comprise:
extracting, from the first document, an initial set of weights indicating a weight attributed to each section of the plurality of sections; and
applying each weight from the initial set of weights to the section text token score of a corresponding section to obtain a weighted section text token score for each section, wherein determining whether the section text token score for each section of the plurality of sections satisfies the first threshold condition comprises:
determining whether the weighted section text token score for each section satisfies the first threshold condition.

9. The system of claim 1, wherein the operations further comprise:
responsive to extracting the first text data, populating a first data structure with the first text tokens, wherein the first data structure stores each of the first text tokens in association with a section identifier associated with a corresponding section that a text token from the first text tokens was extracted from; and
responsive to extracting the second text data, populating a second data structure with the second text tokens, wherein the second data structure stores each of the second text tokens in association with the section identifier associated with the corresponding section that a text token from the second text tokens was extracted from, wherein the first set of textual feature vectors are generated based on the first data structure and the second set of textual feature vectors are generated based on the second data structure.

10. The system of claim 1, wherein the operations further comprise:
generating a user interface to be rendered by a client device, wherein the user interface includes the second document having a visual indicator displayed with each section of the plurality of sections that is determined to have a respective semantic similarity score that fails to satisfy the first threshold condition.

11. The system of claim 1, wherein the operations further comprise:
performing pre-processing to the first text data and the second text data, wherein:
the pre-processing includes stop word removal and word stemming, and
the first set of textual feature vectors and the second set of textual feature vectors being obtained based on the pre-processed first text data and the pre-processed second text data, respectively.

12. The system of claim 1, wherein:
each section of the plurality of sections of the first document includes a plurality of sentences, the plurality of sentences including the at least one sentence including the predefined keyword;
the first text data comprises n-grams, alphanumeric character strings, or n-grams and alphanumeric character strings of the at least one sentence including the predefined keyword; and
n-grams, alphanumeric character strings, or n-grams and alphanumeric character strings of each sentence of the plurality of sentences that does not include the predefined keyword is not extracted.

13. A non-transitory computer-readable medium storing computer program instructions that, when executed by one or more processors, effectuate operations comprising:
obtaining a first document and a second document each comprising a plurality of sections, wherein each section of the first document comprises at least one sentence including a predefined keyword, and wherein each section of the second document comprises one or more sentences;
identifying, using a first natural language processing (NLP) model, each instance of the predefined keyword in each section of the first document;

for each section of the plurality of sections of the first document:
extracting, using the first NLP model, first text data representing first text tokens of the at least one sentence including the predefined keyword;
generating, using a second NLP model, based on the first text data, a feature vector representing each of the first text tokens of the at least one sentence including the predefined keyword to obtain a first set of textual feature vectors;
for each section of the plurality of sections of the second document:
extracting, using the first NLP model, second text data representing second text tokens of each of the one or more sentences of a given section of the second document;
generating, using the second NLP model, a feature vector representing each of the second text tokens of the given section of the second document to obtain a second set of textual feature vectors;
determining, based on a term frequency-inverse document frequency (TF-IDF) analysis of each section of the first document and the second document, a set of text tokens from the first text tokens and the second text tokens that occur most frequently in the first document and the second document;
selecting a set of feature vectors from the first set of textual feature vectors and the second set of textual feature vectors, wherein each feature vector selected corresponds to a text token from the set of text tokens;
determining a text token similarity score between each text token from the set of text tokens, wherein determining the text token similarity score comprises computing, using a third NLP model, a first distance in a first feature space between each feature vector from the selected set of feature vectors;
generating, for each section of the plurality of sections, a section text token score based on the text token similarity score for each text token of the set of text tokens included in a given section;
determining, for each section of the plurality of sections, whether the section text token score satisfies a first threshold condition, the first threshold condition being satisfied for a section text token score that is greater than or equal to a threshold text token score; and
generating and storing a data flag with each section of the plurality of sections of the second document having a respective threshold text token score failing to satisfy the first threshold condition.

14. The non-transitory computer-readable medium of claim 13, wherein the operations further comprise:
determining, for each section of the plurality of sections, a semantic similarity score between each text token from the first text tokens and the second text tokens, wherein determining the semantic similarity score comprises computing, using a fourth NLP model, a second distance in a second feature space between each feature vector from the first set of textual feature vectors and the second set of textual feature vectors, wherein the semantic similarity score indicates how semantically similar two text tokens are to one another;
generating, for each section of the plurality of sections, a section semantic score based on the semantic similarity score for each text token included in a given section of the second document; and
determining, for each section of the plurality of sections, whether the section semantic score satisfies a second threshold condition, the second threshold condition being satisfied for a section semantic score that is greater than or equal to a second threshold semantic similarity score, wherein the data flag is further generated and stored with each section of the plurality of sections having a corresponding section semantic score that satisfies the second threshold condition.

15. The non-transitory computer-readable medium of claim 14, wherein determining the semantic similarity score for each section of the plurality of sections comprises:
(i) selecting a feature vector from the first set of textual feature vectors and a feature vector from the second set of textual feature vectors;
(ii) computing the second distance in the second feature space between the feature vector from the first set of textual feature vectors and the feature vector from the second set of textual feature vectors;
(iii) selecting an additional feature vector from the second set of textual feature vectors;
(iv) computing the second distance in the second feature space between the feature vector from the first set of textual feature vectors and the additional feature vector from the second set of textual feature vectors;
(v) repeating steps (iii) and (iv) for each feature vector of the second set of textual feature vectors; and
(vi) repeating steps (i)-(v) for each additional feature vector from the first set of textual feature vectors, wherein semantic similarity score for a given text token of the first text tokens and a given text token from the second text tokens comprises the second distance between a corresponding feature vector from the first set of textual feature vectors and a corresponding feature vector from the second set of textual feature vectors.

16. The non-transitory computer-readable medium of claim 14, wherein generating the section semantic score for a given section comprises averaging the semantic similarity score for each text token included in the given section to obtain an average semantic similarity score for the given section, determining whether the section semantic score for the given section satisfies the second threshold condition comprises:
determining whether the average semantic similarity score for the given section is greater than or equal to the second threshold semantic similarity score.

17. The non-transitory computer-readable medium of claim 13, wherein the operations further comprise:
tagging, using the second NLP model, each of the first text tokens and each of the second text tokens with a part-of-speech (POS) tag indicating a part of speech that a given text token represents;
detecting, using the second NLP model, one or more named entities within the at least one sentence of a given section of the first document and within the one or more sentences of the given section of the second document; and
assigning, using the second NLP model, a named entity recognition (NER) tag to each of the one or more named entities detected within the at least one sentence and within the one or more sentences, wherein:
each feature vector of the first set of textual feature vectors is generated based on the NER tag assigned to each of the one or more named entities detected within the at least one sentence, and each feature vector of the second set of textual feature vectors is generated based on the NER tag assigned to each of the one or more named entities detected within the given section.

18. The non-transitory computer-readable medium of claim 13, wherein the operations further comprise:
responsive to extracting the first text data, populating a first data structure with the first text tokens, wherein the first data structure stores each of the first text tokens in association with a section identifier associated with a corresponding section that a text token from the first text tokens was extracted from; and
responsive to extracting the second text data, populating a second data structure with the second text tokens, wherein the second data structure stores each of the second text tokens in association with the section identifier associated with the corresponding section that a text token from the second text tokens was extracted from, wherein the first set of textual feature vectors are generated based on the first data structure and the second set of textual feature vectors are generated based on the second data structure.

19. The non-transitory computer-readable medium of claim 13, wherein the operations further comprise:
generating a user interface to be rendered by a client device, wherein the user interface includes the second document having a visual indicator displayed with each section of the plurality of sections that is determined to have a respective semantic similarity score that fails to satisfy the first threshold condition.

20. A method implemented by one or more processors configured to execute computer program instructions, the method comprising:
obtaining a first document and a second document each comprising a plurality of sections, wherein each section of the first document comprises at least one sentence including a predefined keyword, and wherein each section of the second document comprises one or more sentences;
identifying, using a first natural language processing (NLP) model, each instance of the predefined keyword in each section of the first document;
for each section of the plurality of sections of the first document:
extracting, using the first NLP model, first text data representing first text tokens of the at least one sentence including the predefined keyword;
generating, using a second NLP model, based on the first text data, a feature vector representing each of the first text tokens of the at least one sentence including the predefined keyword to obtain a first set of textual feature vectors;
for each section of the plurality of sections of the second document:
extracting, using the first NLP model, second text data representing second text tokens of each of the one or more sentences of a given section of the second document;
generating, using the second NLP model, based on the second text data, a feature vector representing each of the second text tokens of the given section of the second document to obtain a second set of textual feature vectors;
determining, based on a term frequency-inverse document frequency (TF-IDF) analysis of each section of the first document and the second document, a set of text tokens from the first text tokens and the second text tokens that occur most frequently in the first document and the second document;
selecting a set of feature vectors from the first set of textual feature vectors and the second set of textual feature vectors, wherein each feature vector selected corresponds to a text token from the set of text tokens;
determining a text token similarity score between each text token from the set of text tokens, wherein determining the text token similarity score comprises computing, using a third NLP model, a first distance in a first feature space between each feature vector from the selected set of feature vectors;
generating, for each section of the plurality of sections, a section text token score based on the text token similarity score for each text token of the set of text tokens included in a given section;
determining, for each section of the plurality of sections, whether the section text token score satisfies a first threshold condition, the first threshold condition being satisfied for a section text token score that is greater than or equal to a threshold text token score; and
generating and storing a data flag with each section of the plurality of sections of the second document having a respective threshold text token score failing to satisfy the first threshold condition.

* * * * *